United States Patent
Tie et al.

(10) Patent No.: US 12,537,695 B2
(45) Date of Patent: *Jan. 27, 2026

(54) IDENTITY AUTHENTICATION METHOD AND APPARATUS, AND STORAGE MEDIUM, PROGRAM AND PROGRAM PRODUCT

(71) Applicant: CHINA IWNCOMM CO., LTD., Shaanxi (CN)

(72) Inventors: Manxia Tie, Xi'an (CN); Jun Cao, Xi'an (CN); Xiaolong Lai, Xi'an (CN); Xiaorong Zhao, Xi'an (CN); Qin Li, Xi'an (CN); Bianling Zhang, Xi'an (CN); Yuehui Wang, Xi'an (CN); Dandan Ma, Xi'an (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 226 days.

This patent is subject to a terminal disclaimer.

(21) Appl. No.: 18/259,295

(22) PCT Filed: Dec. 21, 2021

(86) PCT No.: PCT/CN2021/140073
§ 371 (c)(1),
(2) Date: Jun. 26, 2023

(87) PCT Pub. No.: WO2022/135391
PCT Pub. Date: Jun. 30, 2022

(65) Prior Publication Data
US 2024/0064027 A1    Feb. 22, 2024

(30) Foreign Application Priority Data
Dec. 26, 2020  (CN) .......................... 202011569236.9

(51) Int. Cl.
*H04L 9/32*    (2006.01)

(52) U.S. Cl.
CPC .......... *H04L 9/3263* (2013.01); *H04L 9/3228* (2013.01); *H04L 9/3247* (2013.01)

(58) Field of Classification Search
CPC ....... H04L 9/3263; H04L 9/32; H04L 9/3247; H04L 9/3228; H04L 9/3268; H04W 12/069; H04W 12/06
See application file for complete search history.

(56) References Cited

U.S. PATENT DOCUMENTS 8,312,262 B2   11/2012  Mauro, II
8,892,869 B2   11/2014  Grebovich
(Continued)

FOREIGN PATENT DOCUMENTS

CN   101364875 A   2/2009
CN   101631113 A   1/2010
(Continued)

OTHER PUBLICATIONS

International Search Report in the international application No. PCT/CN2021/140073, mailed on Mar. 1, 2022, 2 pages.
(Continued)

*Primary Examiner* — Tae K Kim
(74) *Attorney, Agent, or Firm* — Cooper Legal Group, LLC

(57) ABSTRACT

Disclosed is an identity authentication method. By means of the method, confidentiality processing is performed on identity information of a requesting device, to prevent the identity information of the requesting device from being exposed during a transmission process, thereby ensuring that an attacker cannot obtain private information of the requesting device. Moreover, by means of introducing an authentication server, identity authentication performed on the requesting device by an authentication access controller is realized while ensuring the confidentiality of information (Continued)

related to an entity identity, so as to ensure that only legitimate users can access a network. Further disclosed are an identity authentication apparatus, a storage medium, a program, and a program product.

20 Claims, 8 Drawing Sheets

(56) References Cited

U.S. PATENT DOCUMENTS

| | | | |
|---|---|---|---|
| 9,450,944 | B1 | 9/2016 | Sousley |
| 2005/0021968 | A1 | 1/2005 | Zimmer |
| 2005/0283608 | A1 | 12/2005 | Halcrow |
| 2011/0055561 | A1 | 3/2011 | Xiaolong |
| 2013/0205374 | A1 | 8/2013 | Du |
| 2013/0318588 | A1 | 11/2013 | Metzger |
| 2015/0244695 | A1 | 8/2015 | Lin et al. |
| 2017/0063843 | A1 | 3/2017 | Vijayasankar et al. |
| 2017/0085557 | A1* | 3/2017 | Hu ................. H04L 63/062 |
| 2017/0155629 | A1 | 6/2017 | Gomi et al. |
| 2018/0124597 | A1 | 5/2018 | Malthankar et al. |
| 2018/0181739 | A1 | 6/2018 | Zhong et al. |
| 2018/0278625 | A1 | 9/2018 | Cammarota et al. |
| 2018/0302395 | A1 | 10/2018 | Tse et al. |
| 2018/0375663 | A1* | 12/2018 | Le Saint ............. H04L 9/3247 |
| 2019/0158468 | A1* | 5/2019 | Duong ................. H04L 51/04 |
| 2020/0250670 | A1 | 8/2020 | Capuzzello |

FOREIGN PATENT DOCUMENTS

| | | |
|---|---|---|
| CN | 101631114 A | 1/2010 |
| CN | 101635709 A | 1/2010 |
| CN | 101958890 A | 1/2011 |
| CN | 104009889 A | 8/2014 |
| CN | 107948189 A | 4/2018 |
| CN | 109787988 A | 5/2019 |
| CN | 111314072 A | 6/2020 |
| JP | 2006350905 A | 12/2006 |
| JP | 2013544052 A | 12/2013 |
| JP | 2018530269 A | 10/2018 |
| RU | 2733828 C1 | 10/2020 |
| WO | 2011020279 A1 | 2/2011 |

OTHER PUBLICATIONS

English translation of the Written Opinion of the International Search Authority in the international application No. PCT/CN2021/140073, mailed on Mar. 1, 2022, 4 pages.
Supplementary European Search Report in the European application No. 21909387.9, mailed on Apr. 26, 2024, 6 pages.
National Information Security Standardization Technical Committee), "Information security technology—Entity authentication involving a trusted third party and access architecture specification", (National Standards of the People's Republic of China GB/T 28455-2012), Jun. 29, 2012(Jun. 29, 2012), full text, pp. 1-230.
Li Ming et al., "The Implementation and Application of Trusted Connect Architecture", (Journal of Information Security Research), Apr. 30, 2017, entire document.
International Search Report in the international application No. PCT/CN2021/140097, mailed on Mar. 1, 2022, 3 pages.
English translation of the Written Opinion of the International Search Authority in the international application No. PCT/CN2021/140097, mailed on Mar. 1, 2022, 4 pages.
Supplementary European Search Report in the European application No. 21909394.5, mailed on May 27, 2024, 6 pages.
Notice of Allowance of the Japanese application No. 2023-539136, issued on Jul. 9, 2024,5 pages with English translation.
Notice of Allowance of the Russian application No. 2023119361, issued on Sep. 27, 2023, 46 pages with English translation.
International Search Report in the international application No. PCT/CN2021/140078, mailed on Mar. 22, 2022, 2 pages.
English translation of the Written Opinion of the International Search Authority in the international application No. PCT/ CN2021/140078, mailed on Mar. 22, 2022, 3 pages.
Supplementary European Search Report in the European application No. 21909388.7, mailed on Apr. 26, 2024, 6 pages.
Notice of Allowance of the U.S. Appl. No. 18/259,307, issued on Mar. 26, 2025, 28 pages.
Notice of Allowance of the U.S. Appl. No. 18/259,308, issued on Mar. 17, 2025, 52 pages.

* cited by examiner

IDENTITY AUTHENTICATION METHOD AND APPARATUS, AND STORAGE MEDIUM, PROGRAM AND PROGRAM PRODUCT

CROSS-REFERENCE TO RELATED APPLICATIONS

The present application is filed on the basis of Chinese Patent Application No. 202011569236.9, filed on Dec. 26, 2020 and entitled "Identity Authentication Method and Apparatus", and claims priority to said Chinese patent application, which is incorporated herein in its entirety as a reference.

TECHNICAL FIELD

The present application relates to the technical field of network communication security, and relates in particular to an identity authentication method and apparatus, a storage medium, a program, and a program product.

BACKGROUND

In a communication network, a requester may access the network by means of an authentication access controller. In some cases where security requirements are relatively high, the authentication access controller needs to authenticate the identity of the requester to ensure that the requester accessing the network belongs to a legitimate user. Furthermore, node-to-node transmission in blockchain technology also requires that a trust relationship is established between different nodes, so that identity authentication for nodes is also very important.

During identity authentication performed on the requester, the requester needs to provide identity information thereof for the identity authentication. However, such identity information typically carries private or sensitive information such as an identification card number, a home address, bank card information, etc. Furthermore, in actual applications, such identity information is typically included in a digital certificate of an entity, and the digital certificate is used as an identity proof of the entity. If the identity information of the requester is maliciously intercepted during the identity authentication of the requester, and is used for illegitimate purposes, severe security risks are posed to the authentication access controller, the requester, and the network.

SUMMARY

Provided in embodiments of the present application are an identity authentication method and apparatus, a storage medium, a program, and a program product. An authentication server is introduced, so that an authentication access controller can perform a unilateral identity authentication on a requester while confidentiality of identity related information of entities is ensured.

The technical solution of the embodiments of the present invention can be achieved as follows.

According to a first aspect, provided in an embodiment of the present application is an identity authentication method, comprising:

acquiring, by an authentication access controller, an identity ciphertext message sent by a requester, the identity ciphertext message comprising an identity information ciphertext of the requester, and the identity information ciphertext being generated by using a public key of an encryption certificate to encrypt information comprising a digital certificate of the requester and a protection nonce;

sending, by the authentication access controller, a first authentication request message to a first authentication server trusted thereby, the first authentication request message comprising the identity information ciphertext of the requester;

receiving, by the authentication access controller, a first authentication response message sent by the first authentication server, the first authentication response message comprising an authentication result information ciphertext and a digital signature of the first authentication server, the authentication result information ciphertext being generated by a second authentication server trusted by the requester through using the protection nonce acquired by decrypting the identity information ciphertext to encrypt information comprising identity authentication result information of the requester, and the identity authentication result information comprising a verification result of the digital certificate of the requester acquired by decrypting the identity information ciphertext;

using, by the authentication access controller, a message encryption key to decrypt a protection nonce ciphertext acquired from the requester to acquire the protection nonce, and using the protection nonce to decrypt the authentication result information ciphertext to acquire the identity authentication result information of the requester, the protection nonce ciphertext being generated by the requester through using the message encryption key to encrypt information comprising the protection nonce;

verifying, by the authentication access controller, the digital signature of the first authentication server; and after the digital signature of the first authentication server is successfully verified, determining, by the authentication access controller, an identity authentication result of the requester according to the verification result of the digital certificate of the requester in the identity authentication result information.

According to a second aspect, provided in an embodiment of the present application is an authentication access controller, comprising:

an acquisition portion, configured to acquire an identity ciphertext message sent by a requester, the identity ciphertext message comprising an identity information ciphertext of the requester, and the identity information ciphertext being generated by using a public key of an encryption certificate to encrypt information comprising a digital certificate of the requester and a protection nonce;

a first sending portion, configured to send a first authentication request message to a first authentication server trusted by the authentication access controller, the first authentication request message comprising the identity information ciphertext of the requester;

a first receiving portion, configured to receive a first authentication response message sent by the first authentication server, the first authentication response message comprising an authentication result information ciphertext and a digital signature of the first authentication server, the authentication result information ciphertext being generated by a second authentication server trusted by the requester through using the protection nonce acquired by decrypting the identity information ciphertext to encrypt information comprising identity authentication result information of the requester, and the identity authentication result information comprising a verification result of the digital certificate of the requester acquired by decrypting the identity information ciphertext:

a first decryption portion, configured to use a message encryption key to decrypt a protection nonce ciphertext acquired from the requester to acquire the protection nonce, and use the protection nonce to decrypt the authentication result information ciphertext to acquire the identity authentication result information of the requester, the protection nonce ciphertext being generated by the requester through using the message encryption key to encrypt information comprising the protection nonce;

a first verification portion, configured to verify the digital signature of the first authentication server; and a determination portion, configured to determine, after the digital signature of the first authentication server is successfully verified, an identity authentication result of the requester according to the verification result of the digital certificate of the requester in the identity authentication result information.

According to a third aspect, further provided in an embodiment of the present application is a requester, comprising:

a first encryption portion, configured to use a public key of an encryption certificate to encrypt information comprising a digital certificate of the requester and a protection nonce, and generate an identity information ciphertext;

a first sending portion, configured to send an identity ciphertext message to an authentication access controller, the identity ciphertext message comprising the identity information ciphertext of the requester; and a second encryption portion, configured to use a message encryption key to encrypt information comprising the protection nonce, and generate a protection nonce ciphertext.

According to a fourth aspect, further provided in an embodiment of the present application is a first authentication server, being an authentication server trusted by an authentication access controller, the first authentication server comprising:

a first receiving portion, configured to receive a first authentication request message sent by an authentication access controller, the first authentication request message comprising an identity information ciphertext of the requester, and the identity information ciphertext being generated by using a public key of an encryption certificate to encrypt information comprising a digital certificate of the requester and a protection nonce; and a first sending portion, configured to send a first authentication response message to the authentication access controller, the first authentication response message comprising an authentication result information ciphertext and a digital signature of the first authentication server, the authentication result information ciphertext being generated by a second authentication server trusted by the requester through using the protection nonce acquired by decrypting the identity information ciphertext to encrypt information comprising identity authentication result information of the requester, and the identity authentication result information comprising a verification result of the digital certificate of the requester acquired by decrypting the identity information ciphertext;

According to a fifth aspect, further provided in an embodiment of the present application is a second authentication server, being an authentication server trusted by a requester. When a first authentication server trusted by an authentication access controller and the second authentication server trusted by the requester are two different authentication servers, the second authentication server comprises:

a receiving portion, configured to receive a second authentication request message sent by the first authentication server, the second authentication request message comprising an identity information ciphertext of the requester, and the identity information ciphertext being generated by using a public key of an encryption certificate to encrypt information comprising a digital certificate of the requester and a protection nonce; and a decryption portion, configured to use a private key corresponding to the encryption certificate to decrypt encrypted identity information of the requester to acquire the digital certificate of the requester and the protection nonce;

a generation portion, configured to perform legality verification on the digital certificate to acquire a verification result of the digital certificate, generate identity authentication result information according to information comprising the verification result of the digital certificate, use the protection nonce to encrypt information comprising the identity authentication result information to generate an authentication result information ciphertext, perform calculation on to-be-signed data comprising the authentication result information ciphertext to generate a digital signature of the second authentication server, and generate a second authentication response message according to information comprising the authentication result information ciphertext and the digital signature of the second authentication server; and a sending portion, configured to send the second authentication response message to the first authentication server.

According to a six aspect, further provided in an embodiment of the present application is an authentication access controller, comprising:

a first processor;

a first memory for storing instructions executable by the first processor, herein the first processor is configured to call instructions stored in the first memory to perform operations performed by the authentication access controller in the identity authentication method according to the first aspect.

According to a seventh aspect, further provided in an embodiment of the present application is a requester, comprising:

a second processor; and a second memory for storing instructions executable by the second processor, herein the second processor is configured to call instructions stored in the second memory to perform operations performed by the requester in the identity authentication method according to the first aspect.

According to an eighth aspect, further provided in an embodiment of the present application is a first authentication server, comprising:

a third processor; and a third memory for storing instructions executable by the third processor, herein the third processor is configured to call instructions stored in the third memory to perform operations performed by the first authentication server in the identity authentication method according to the first aspect.

According to a ninth aspect, further provided in an embodiment of the present application is a second authentication server, comprising:
- a fourth processor; and
- a fourth memory for storing instructions executable by the fourth processor,
- herein the fourth processor is configured to call instructions stored in the fourth memory to perform operations performed by the second authentication server in the identity authentication method according to the first aspect.

According to a tenth aspect, further provided in an embodiment of the present application is a computer-readable storage medium, having a computer program stored thereon. The computer program, when run by a processor, performs operations performed by the authentication access controller, the requester, the first authentication server, or the second authentication server in the identity authentication method according to the first aspect.

According to an eleventh aspect, further provided in an embodiment of the present application is a computer program, comprising computer-readable code. When the computer-readable code is run in a computer device, a processor in the computer device performs operations performed by the authentication access controller, the requester, the first authentication server, or the second authentication server in the identity authentication method according to the first aspect.

According to a twelfth aspect, further provided in an embodiment of the present application is a computer program product, comprising computer program instructions. The computer program instructions enables a computer to perform operations performed by the authentication access controller, the requester, the first authentication server, or the second authentication server in the identity authentication method according to the first aspect.

It can be seen from the above technical solution that during identity information transmission, performing confidentiality processing on identity information of a requester can prevent the identity information from being exposed while the requester is accessing a network, and ensure that an attacker cannot acquire private or sensitive information. In addition, an authentication server is introduced, so that an authentication access controller can perform a unilateral real-time identity authentication on a requester while confidentiality of identity related information of entities is ensured, thereby laying the foundation for ensuring that only a legitimate user can access the network.

BRIEF DESCRIPTION OF THE DRAWINGS

In order to describe the technical solutions in the embodiments of the present application or in the prior art more clearly, accompanying drawings to be used for description of the embodiments or the prior art will be briefly introduced below. Obviously, the accompanying drawings in the following description are merely some of the embodiments of the present application. Those of ordinary skill in the art could further obtain other accompanying drawings according to these accompanying drawings without the exercise of inventive effort.

DETAILED DESCRIPTION

Figure 1:
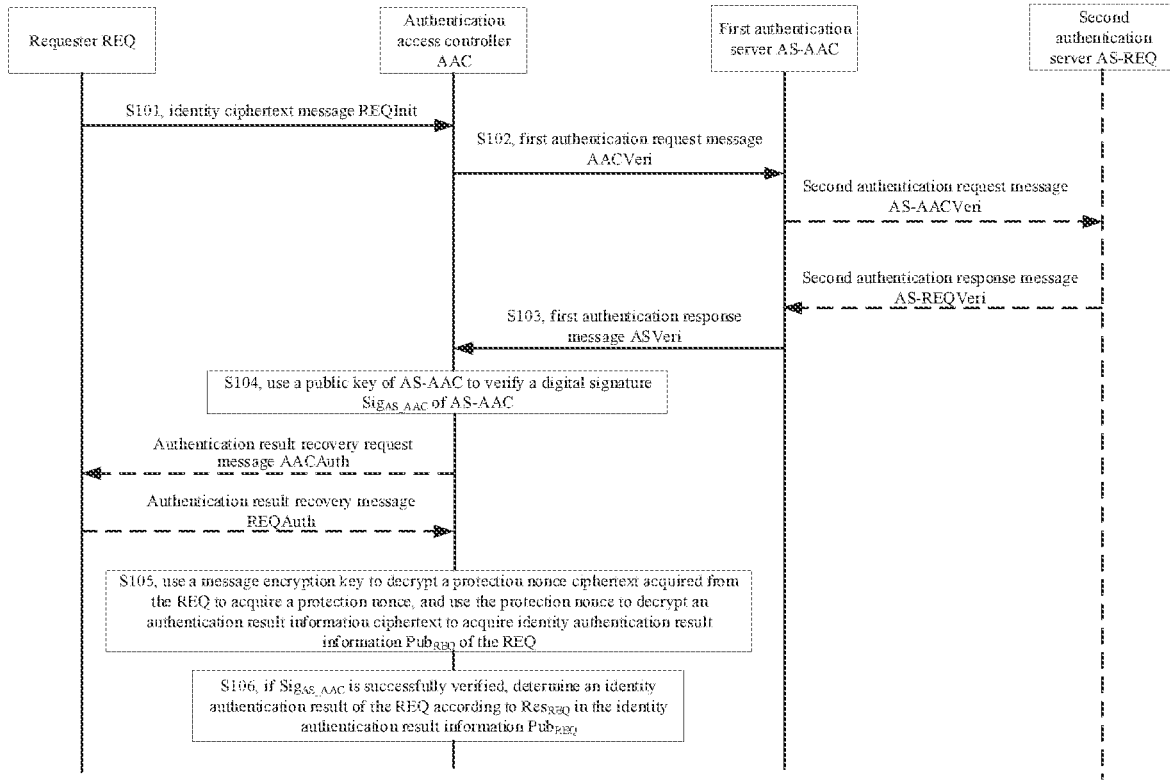
FIG. 1 is a schematic diagram of an identity authentication method according to an embodiment of the present application.

In a communication network, a requester may access the network by means of an authentication access controller. In order to ensure that the requester accessing the network belongs to a legitimate user, the authentication access controller needs to authenticate the identity of the requester.

Current wireless communication and mobile communication scenarios are used as an example. In a scenario where a requester accesses a wireless network by means of an authentication access controller, the requester may be a terminal apparatus such as a mobile phone, a personal digital assistant (PDA), a tablet computer, or the like, and the authentication access controller may be a network side apparatus such as a wireless access point, a wireless router, or the like. In a scenario where a requester accesses a wired network by means of an authentication access controller, the requester may be a terminal apparatus such as a desktop computer, a notebook computer, or the like, and the authentication access controller may be a network side apparatus such as a switch, a router, or the like. In a scenario where a requester accesses a network of the 4th/5th Generation mobile communication technology (4G/5G) by means of an authentication access controller, the requester may be a terminal apparatus such as a mobile phone, a tablet computer, or the like, and the authentication access controller may be a network side apparatus such as a base station or the like. Certainly, the present application is equally applicable to various data communication scenarios such as other wired networks, near field communication networks, etc.

However, during identity authentication of the requester, the requester needs to provide identity information thereof for identity authentication. The identity information is typically included in a digital certificate of the requester, and includes private or sensitive information. If an attacker intercepts the identity information, and uses the same for illegitimate purposes, severe security risks are posed to the authentication access controller, the requester, or even the network.

To address the above technical problem, provided in an embodiment of the present application is an identity authentication method. An authentication access controller acquires an identity ciphertext message sent by a requester. The identity ciphertext message includes an identity information ciphertext of the requester, and the identity information ciphertext is generated by using a public key of an encryption certificate to encrypt information including a digital certificate of the requester and a protection nonce. Then, the authentication access controller sends to the first authentication server a first authentication request message including the identity information ciphertext, and receives a first authentication response message sent by the first authentication server. The first authentication response message includes an authentication result information ciphertext and a digital signature of the first authentication server. The authentication result information ciphertext is generated by a second authentication server trusted by the requester by using the protection nonce acquired by decrypting the identity information ciphertext to encrypt information including identity authentication result information of the requester. The identity authentication result information includes a verification result of the digital certificate of the requester acquired by decrypting the identity information ciphertext. The security of transmission of the identity authentication result information of the requester between the authentication access controller and the first authentication server can be ensured by means of the authentication result information ciphertext. Second, the authentication access controller uses a message encryption key to decrypt a protection nonce ciphertext acquired from the requester to acquire the protection nonce, and uses the protection nonce to decrypt the authentication result information ciphertext to acquire the identity authentication result information of the requester. The authentication access controller verifies the digital signature of the first authentication server. After verification is successful, the authentication access controller determines an identity authentication result of the requester according to the verification result of the digital certificate of the requester in the identity authentication result information.

It can be understood that the authentication result information mentioned in the embodiments of the present application may be acquired by the authentication server trusted by the requester by performing legality verification on the digital certificate of the requester. The above are merely some examples of the requester, the authentication access controller, and the authentication server, and should not be construed as limitations on the requester, the authentication access controller, and the authentication server. In other possible implementations of the embodiments of the present application, the requester, the authentication access controller, and the authentication server may also be other apparatuses.

The identity authentication method provided in the embodiment of the present application is for implementing a unilateral REQ Authentication with an Unauthenticated AAC (RADA).

For ease of description, in the embodiments of the present application, the identity authentication method of the present application will be described by using a requester (REQ), an authentication access controller (AAC), and an authentication server (AS) as an example.

The AS is a trusted third-party entity, and holds a digital certificate meeting specifications of ISO/IEC 9594-8/ITU X.509, other standards or other technical systems, and a private key corresponding to the digital certificate. An AS trusted by the AAC is referred to as a first authentication server AS-AAC. An AS trusted by the REQ is referred to as a second authentication server AS-REQ, and has the capability of verifying the legality of a digital certificate of the REQ. When AS-AAC is different from AS-REQ, AS-AAC and AS-REQ trust each other, and know the digital certificate or a public key in the digital certificate of each other. A certificate server-decrypt (CS-DEC) holds an encryption certificate meeting specifications of ISO/IEC 9594-8/ITU X.509, other standards or other technical systems, and a private key corresponding to the encryption certificate. The CS-DEC may be a stand-alone server, or may be reside in AS-REQ.

The REQ may be an end point participating in an identity authentication process, is connected to the AAC, accesses a service provided by the AAC, and accesses the AS by means of the AAC. The REQ holds a digital certificate meeting specifications of ISO/IEC 9594-8/ITU X.509, other standards or other technical systems, and a private key corresponding to the digital certificate, and knows the encryption certificate of the CS-DEC or a public key in the encryption certificate. The AAC may be another end point participating in the identity authentication process, is connected to the REQ, provides a service, communicates with the REQ, and can access AS-AAC directly. The AAC knows the digital certificate of AS-AAC or the public key in the digital certificate.

An identity authentication method provided in an embodiment of the present application will be described below with reference to FIG. 1. The method includes the following operations.

At S101, an AAC acquires an identity ciphertext message REQInit sent by a REQ.

REQInit includes an identity information ciphertext $EncPub_{AS}$ of the REQ. $EncPub_{AS}$ is generated by the REQ by using a public key of an encryption certificate to encrypt information including a digital certificate $Cert_{REQ}$ of the REQ and a protection nonce. Therefore, during identity information transmission, confidentiality processing is performed on identity information of the REQ, so as to prevent the identity information of the REQ from being exposed during the transmission.

At S102, the AAC sends a first authentication request message AACVeri to AS-AAC trusted thereby.

AACVeri includes $EncPub_{AS}$.

It should be noted that an authentication server trusted by the REQ and an authentication server trusted by the AAC may be the same or different, so that when AS-REQ trusted by the REQ and AS-AAC trusted by the AAC are the same authentication server, that is, when in a non-roaming scenario, the authentication server trusted by both the REQ and the AAC may be represented by AS-AAC (or, certainly, AS-REQ). A method for processing $EncPub_{AS}$ in this scenario includes: using, by AS-AAC (which may also be represented by AS-REQ), a private key corresponding to an encryption certificate of a certificate server-decrypt (CS-DEC) residing in AS-AAC (which may also be represented by AS-REQ) to decrypt $EncPub_{AS}$ to acquire $Cert_{REQ}$ and the protection nonce, or sending, by AS-AAC (which may also be represented by AS-REQ), $EncPub_{AS}$ to a CS-DEC having an interactive and trust relationship therewith to decrypt the same, acquiring $Cert_{REQ}$ and the protection nonce acquired by means of decryption; then verifying the legality of $Cert_{REQ}$ to acquire a verification result $Res_{REQ}$, generating identity authentication result information $Pub_{REQ}$ according to information including $Res_{REQ}$, using the protection nonce to encrypt information including $Pub_{REQ}$ and generating an authentication result information ciphertext, performing calculation on to-be-signed data including the authentication result information ciphertext and generating a digital signature $Sig_{AS\_AAC}$ (which may also be represented by $Sig_{AS\_REQ}$), and then generating a first authentication response message ASVeri including the authentication result information ciphertext and $Sig_{AS\_AAC}$ (which may also be represented by $Sig_{AS\_REQ}$).

When AS-REQ trusted by the REQ and AS-AAC trusted by the AAC are two different authentication servers, that is, when in a roaming scenario, a method for processing $EncPub_{AS}$ in this scenario includes: sending, by AS-AAC, a second authentication request message AS-AACVeri including $EncPub_{AS}$ to AS-REQ, and using, by AS-REQ, a private key corresponding to an encryption certificate of a certificate server-decrypt (CS-DEC) residing in AS-REQ to decrypt $EncPub_{AS}$ to acquire $Cert_{REQ}$ and the protection nonce, or sending, by AS-REQ, $EncPub_{AS}$ to a CS-DEC having an interactive and trust relationship therewith to decrypt the same, acquiring $Cert_{REQ}$ and the protection nonce acquired by means of decryption, then verifying the legality of $Cert_{REQ}$ to acquire a verification result $Res_{REQ}$, generating identity authentication result information $Pub_{REQ}$ according to information including $Res_{REQ}$, using the protection nonce to encrypt information including $Pub_{REQ}$ and generating an authentication result information ciphertext, performing calculation on to-be-signed data including the authentication result information ciphertext and generating a digital signature $Sig_{AS\_REQ}$, generating a second authentication response message AS-REQVeri including the authentication result information ciphertext and $Sig_{AS\_REQ}$, and sending AS-REQVeri to AS-AAC; upon receiving AS-REQVeri, using, by AS-AAC, a public key of AS-REQ to verify $Sig_{AS\_REQ}$, and after verification is successful, performing, by AS-AAC, calculation on the to-be-signed data including the authentication result information ciphertext and generating a digital signature $Sig_{AS\_AAC}$, and generating a first authentication response message ASVeri according to information including the authentication result information ciphertext and $Sig_{AS\_AAC}$.

At S103, the AAC receives a first authentication response message ASVeri sent by AS-AAC.

ASVeri includes the authentication result information ciphertext and the digital signature $Sig_{AS\_AAC}$ of AS-AAC. The authentication result information ciphertext is generated by AS-REQ trusted by the REQ by using the protection nonce acquired by decrypting $EncPub_{AS}$ to encrypt information including the identity authentication result information $Pub_{REQ}$ of the REQ. $Pub_{REQ}$ includes the verification result $Res_{REQ}$ of $Cert_{REQ}$ acquired by decrypting $EncPub_{AS}$. The to-be-signed data of $Sig_{AS\_AAC}$ includes the authentication result information ciphertext in ASVeri.

At S104, the AAC uses a public key of the AS-AAC to verify $Sig_{AS\_AAC}$.

At S105, the AAC uses a message encryption key to decrypt a protection nonce ciphertext acquired from the REQ to acquire a protection nonce, and uses the protection nonce to decrypt an authentication result information ciphertext to acquire identity authentication result information $Pub_{REQ}$ of the REQ.

The protection nonce ciphertext is generated by the REQ by using the message encryption key to encrypt information including the protection nonce. The message encryption key may be acquired by means of negotiation between the REQ and the AAC, or may be pre-shared by the REQ and the AAC. It should be noted that the AAC may acquire the protection nonce ciphertext from the REQ in the following manners:

(1) REQInit may further include the protection nonce ciphertext, so that after S101, the AAC acquires the protection nonce ciphertext in REQInit. Correspondingly, in S105, the using, by the AAC, the message encryption key to decrypt the protection nonce ciphertext acquired from the REQ to acquire the protection nonce includes: using, by the AAC, the message encryption key to decrypt the protection nonce ciphertext in REQInit to acquire the protection nonce.

(2) After the REQ sends REQInit, the REQ may further send an authentication result recovery message REQAuth to the AAC, and REQAuth includes the protection nonce ciphertext, so that after the AAC receives REQAuth, the protection nonce ciphertext in REQAuth can be acquired. Correspondingly, in S105, the using, by the AAC, the message encryption key to decrypt the protection nonce ciphertext acquired from the REQ to acquire the protection nonce includes: using, by the AAC, the message encryption key to decrypt the protection nonce ciphertext in REQAuth to acquire the protection nonce.

At S106, if $Sig_{AS\_AAC}$ is successfully verified, the AAC determines an identity authentication result of the REQ according to $Res_{REQ}$ in the identity authentication result information $Pub_{REQ}$.

It should be noted that no limitation is set on the order of performing S104 and S105. Certainly, S104 may be performed first, and after $Sig_{AS\_AAC}$ is successfully verified in S104, S105 and the operation of determining, by the AAC, the identity authentication result of the REQ according to $Res_{REQ}$ in the identity authentication result information $Pub_{REQ}$ in S106 are performed.

It can be seen from the above technical solution that during identity information transmission, performing confidentiality processing on identity information of a requester can prevent the identity information from being exposed during network transmission, and ensure that an attacker cannot acquire private or sensitive information. In addition, an authentication server is introduced, so that an authentication access controller can perform a unilateral real-time identity authentication on a requester while confidentiality of identity related information of entities is ensured, thereby laying the foundation for ensuring that only a legitimate user can access the network.

In some embodiments, REQInit in S101 may further include a digital signature $Sig_{REQ}$ of the REQ, and to-be-signed data of Sign includes other fields before $Sig_{REQ}$ in REQInit, so that before S106, the AAC further needs to determine whether $Sig_{REQ}$ is successfully verified, and S106 is performed only if verification is successful. It should be noted that if AS-REQ and AS-AAC are the same authentication server, $Sig_{REQ}$ may be verified by AS-AAC (which may also be represented by AS-REQ), or may be verified by the AAC. If AS-REQ and AS-AAC are two different authentication servers. $Sig_{REQ}$ may be verified by AS-REQ, or may be verified by the AAC. The AAC determines whether $Sig_{REQ}$ is successfully verified in the following manners:

As an embodiment in which the authentication server verifies $Sig_{REQ}$, in the case that AS-REQ and AS-AAC are the same authentication server (i.e., non-roaming), when AS-AAC (which may also be represented by AS-REQ) verifies $Sig_{REQ}$, $Sig_{REQ}$ may be carried in AACVeri of S102 so as to be imparted to AS-AAC (which may also be represented by AS-REQ), and AS-AAC (which may also be represented by AS-REQ) uses $Cert_{REQ}$ acquired by decrypting $EncPub_{AS}$ to verify $Sig_{REQ}$. If verification is successful, legality of $Cert_{REQ}$ is verified to acquire the verification result Resp. The identity authentication result information $Pub_{REQ}$ of the REQ is generated according to information including $Res_{REQ}$ and the protection nonce acquired by decrypting $EncPub_{AS}$ is used to encrypt information including $Pub_{REQ}$ to acquire the authentication result information ciphertext. Then, the operations of generating and sending the first authentication response message, etc., are performed. If verification is not successful, the operations of generating and sending the first authentication response message, etc., are not performed. Thus, the AAC can determine, according to whether the first authentication response message is received, whether $Sig_{REQ}$ is successfully verified. If the AAC receives the first authentication response message ASVeri, the AAC can determine that $Sig_{REQ}$ is successfully verified.

As another embodiment in which the authentication server verifies $Sig_{REQ}$, in the case that AS-REQ and AS-AAC are two different authentication servers (i.e., roaming), when AS-REQ verifies $Sig_{REQ}$, $Sig_{REQ}$ may be carried in AACVeri of S102 and AS-AACVeri sent by AS-AAC to AS-REQ, so as to be imparted to AS-REQ, and AS-REQ uses $Cert_{REQ}$ acquired by decrypting $EncPub_{AS}$ to verify $Sig_{REQ}$. If verification is successful, AS-REQ verifies legality of $Cert_{REQ}$ to acquire the verification result $Res_{REQ}$, generates the identity authentication result information $Pub_{REQ}$ of the REQ according to information including $Res_{REQ}$, uses the protection nonce acquired by decrypting $EncPub_{AS}$ to encrypt information including $Pub_{REQ}$ to acquire the authentication result information ciphertext, and then performs the operations of generating and sending the second authentication response message and generating the subsequent first authentication response message, etc. If verification is not successful, the operations of generating and sending the second authentication response message and generating the subsequent first authentication response message, etc., are not performed. Thus, the AAC can determine, according to whether the first authentication response message is received, whether $Sig_{REQ}$ is successfully verified. If the AAC receives the first authentication response message ASVeri, the AAC can determine that $Sig_{REQ}$ is successfully verified.

As an embodiment in which the AAC verifies $Sig_{REQ}$, the identity authentication result information $Pub_{REQ}$ of the REQ generated by the authentication server includes not only the verification result $Res_{REQ}$ of $Cert_{REQ}$, but also $Cert_{REQ}$. Therefore in S105, the identity authentication result information $Pub_{REQ}$ of the REQ acquired by the AAC by decrypting the authentication result information ciphertext further includes $Cert_{REQ}$, so that the AAC uses $Cert_{REQ}$ to verify $Sig_{REQ}$, so as to determine whether $Sig_{REQ}$ is successfully verified.

In some other embodiments, if the protection nonce ciphertext acquired by the AAC from the REQ in S105 is from REQInit of S101, REQInit not only includes the protection nonce ciphertext, but also may further include the digital signature $Sig_{REQ}$ of the REQ, and the to-be-signed data of $Sig_{REQ}$ includes other fields before $Sig_{REQ}$ in REQInit. In this case, the identity authentication result information $Pub_{REQ}$ of the REQ acquired by the AAC by using the protection nonce to decrypt the authentication result information ciphertext in S105 further includes $Cert_{REQ}$, so that before S106, the AAC further needs to use $Cert_{REQ}$ in $Pub_{REQ}$ to verify $Sig_{REQ}$, and determine, according to a verification result, whether $Sig_{REQ}$ is successfully verified, and S106 can be performed only if verification is successful.

In some other embodiments, if the protection nonce ciphertext acquired by the AAC from the REQ in S105 is from the authentication result recovery message REQAuth, REQAuth not only includes the protection nonce ciphertext, but also may further include the digital signature $Sig_{REQ}$ of the REQ, and the to-be-signed data of $Sig_{REQ}$ includes other fields before $Sig_{REQ}$ in REQAuth. In this case, the identity authentication result information $Pub_{REQ}$ of the REQ acquired by the AAC by using the protection nonce to decrypt the authentication result information ciphertext in S105 further includes $Cert_{REQ}$, so that before S106, the AAC further needs to use $Cert_{REQ}$ in $Pub_{REQ}$ to verify $Sig_{REQ}$, and determine, according to a verification result, whether $Sig_{REQ}$ is successfully verified, and S106 can be performed only if verification is successful.

In some other embodiments, messages transmitted between the REQ, the AAC, and the authentication server may further include parameter information such as nonces generated by the AAC and/or the REQ, respective identifiers, etc. Normally, during identity authentication, these nonces and/or identifiers should remain unchanged when being transmitted by means of various messages. However, if cases such as a network jitter or attack, or the like occur, the parameter information such as the nonce and/or the identifier or the like in the message may be lost or tampered with. Thus, consistency verification can also be performed on the identifier and/or the nonce in the message during identity authentication, so as to ensure the reliability and freshness of the authentication result.

For example, REQInit of S101 may further include a first nonce $Nonce_{AAC}$ generated by the AAC and/or a second nonce $Nonce_{REQ}$ generated by the REQ, and $Nonce_{AAC}$ is sent by the AAC to the REQ, so that AACVeri in S102 may further include $Nonce_{AAC}$ and/or the identifier $ID_{AAC}$ of the AAC. Correspondingly, ASVeri of S103 may further include $Nonce_{AAC}$ and/or $ID_{AAC}$, and REQAuth sent by the REQ to the AAC may further include $Nonce_{ACC}$ and/or $Nonce_{REQ}$.

Then, before determining the identity authentication result of the REQ, the AAC may first further verify the consistency between $Nonce_{AAC}$ and/or $ID_{AAC}$ in ASVeri and $Nonce_{AAC}$ generated by the AAC and/or the identifier $ID_{AAC}$ of the AAC, and the AAC may further verify the consistency between $Nonce_{ACC}$ and/or $Nonce_{REQ}$ in REQAuth and $Nonce_{AAC}$ generated by the AAC and/or $Nonce_{REQ}$ in REQInit. After verification is successful, the AAC performs the operation of determining the identity authentication result of the REQ in S106.

In some embodiments, REQAuth sent by the REQ to the AAC may further include a second message integrity check code $MacTag_{REQ}$ generated by the REQ by using a message integrity check key to perform calculation on fields other than $MacTag_{REQ}$ in REQAuth, so that before S105, the AAC may further use the message integrity check key to verify $MacTag_{REQ}$. If verification is successful, AAC performs S105. If verification is not successful, REQAuth is discarded. During verification of $MacTag_{REQ}$, the AAC needs to use the message integrity check key to perform calculation on fields other than $MacTag_{REQ}$ in REQAuth to generate $MacTag_{REQ}$, and compare calculated $MacTag_{REQ}$ with $MacTag_{REQ}$ in received REQAuth. If calculated $MacTag_{REQ}$ is consistent with $MacTag_{REQ}$ in received REQAuth, verification is successful; otherwise, verification is not successful.

In some other embodiments, upon receiving ASVeri of S103, the AAC may send an authentication result recovery request message AACAuth to the REQ, and AACAuth includes the first message integrity check code $MacTag_{AAC}$. $MacTag_{AAC}$ is generated by the AAC by using the message integrity check key to perform calculation on fields other than $MacTag_{AAC}$ in AACAuth. Correspondingly, before sending REQAuth, the REQ may first use the message integrity check key to verify $MacTag_{AAC}$. If verification is successful, REQAuth is sent to the AAC. If verification is not successful, AACAuth is discarded. During verification of $MacTag_{AAC}$, the REQ needs to use the message integrity check key to perform calculation on fields other than $MacTag_{AAC}$ in AACAuth to generate $MacTag_{AAC}$, and compare calculated $MacTag_{AAC}$ with $MacTag_{AAC}$ in received AACAuth. If calculated $MacTag_{AAC}$ is consistent with $MacTag_{AAC}$ in received AACAuth, verification is successful; otherwise, verification is not successful. The manner in which the REQ and the AAC generate the message integrity check key will be described in a next embodiment.

Figure 2:
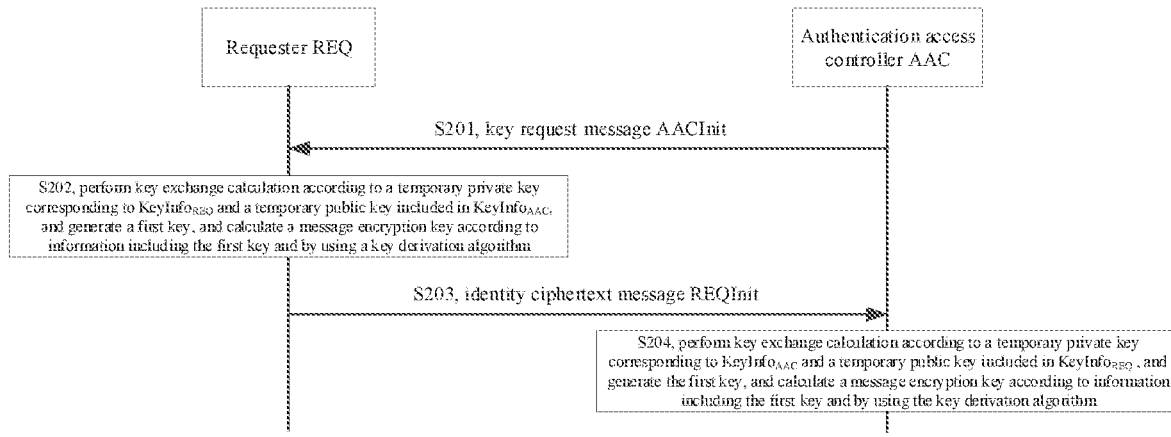
FIG. 2 is a schematic diagram of a method used by a requester (REQ) and an authentication access controller (AAC) to negotiate a message encryption key according to an embodiment of the present application.

In the above embodiment, the message encryption key used by the REQ and the AAC may be acquired by means of negotiation between the REQ and the AAC. Therefore, further provided in this embodiment is a method used by a REQ and an AAC to negotiate a message encryption key. Referring to FIG. 2, the method includes the following operations.

At S201, an AAC sends a key request message AACInit to a REQ.

AACInit includes a key exchange parameter $KeyInfo_{AAC}$ of the AAC. $KeyInfo_{AAC}$ includes a temporary public key of the AAC. Key exchange refers to a key exchange algorithm such as Diffie-Hellman (DH), etc. AACInit may further include a first nonce $Nonce_{AAC}$ generated by the AAC.

AACInit may further include Security $capabilities_{AAC}$. Security $capabilities_{AAC}$ represents security capability parameter information supported by the AAC, and includes an identity authentication suite (the identity authentication suite typically includes one or more identity authentication methods), one or more symmetric encryption algorithms, one or more integrity check algorithms, and/or one or more key derivation algorithms etc., supported by the AAC, so that the REQ selects and uses a specific security policy. Therefore, the REQ may select, according to Security $capabilities_{AAC}$, the specific security policy security $capabilities_{REQ}$ to be used by the REQ. Security $capabilities_{REQ}$ represent an identity authentication method, a symmetric encryption algorithm, an integrity check algorithm, and/or a key derivation algorithm etc., correspondingly determined and used by the REQ.

At S202, the REQ performs key exchange calculation according to a temporary private key corresponding to a key exchange parameter $KeyInfo_{REQ}$ of the REQ and a temporary public key included in $KeyInfo_{AAC}$, and generates a first key, and calculates a message encryption key according to information including the first key and by using a key derivation algorithm.

If AACInit of S201 further includes $Nonce_{AAC}$ generated by the AAC, the REQ may perform key exchange calculation according to a temporary private key corresponding to $KeyInfo_{REQ}$ and a temporary public key included in $KeyInfo_{AAC}$, and generate a first key K1, and calculate a message encryption key according to K1 in combination with information including $Nonce_{AAC}$ and a second nonce $Nonce_{REQ}$ generated by the REQ and by using a negotiated or preset key derivation algorithm. The negotiated key derivation algorithm may be selected by the REQ for use according to Security $capabilities_{AAC}$ sent by the AAC. $KeyInfo_{REQ}$ is the key exchange parameter generated by the REQ, and includes the temporary public key of the REQ. The temporary private key corresponding to $KeyInfo_{REQ}$ is generated by the REQ, and corresponds to the temporary public key of the REQ. That is, the temporary public key and the temporary private key are a temporary public-private key pair.

At S203, the REQ sends an identity ciphertext message REQInit to the AAC.

REQInit includes $KeyInfo_{REQ}$, so that the AAC performs calculation according to information including the temporary private key corresponding to $KeyInfo_{AAC}$ and the temporary public key included in $KeyInfo_{REQ}$ to acquire the message encryption key. The temporary private key corresponding to $KeyInfo_{AAC}$ is generated by the AAC, and corresponds to the temporary public key of the AAC. That is, the temporary public key and the temporary private key are a temporary public-private key pair.

REQInit may further include Security $capabilities_{REQ}$. REQInit may further include $Nonce_{REQ}$, so that the AAC performs calculation according to information including the temporary private key corresponding to $KeyInfo_{AAC}$, the temporary public key included in $KeyInfo_{REQ}$, $Nonce_{AAC}$, and $Nonce_{REQ}$ to acquire the message encryption key.

REQInit may further include $Nonce_{AAC}$, so that before calculating the message encryption key, the AAC may verify the consistency between $Nonce_{AAC}$ in REQInit and $Nonce_{AAC}$ generated by the AAC, so as to ensure that REQInit received by the AAC is a response message for AACInit.

At S204, the AAC performs key exchange calculation according to a temporary private key corresponding to $KeyInfo_{AAC}$ and a temporary public key included in $KeyInfo_{REQ}$ to generate the first key, and calculates a message encryption key according to information including the first key and by using the key derivation algorithm.

If REQInit further includes $Nonce_{REQ}$, the AAC may perform key exchange calculation according to the temporary private key corresponding to $KeyInfo_{AAC}$ and the temporary public key included in $KeyInfo_{REQ}$, and generate the first key K1, and calculate the message encryption key according to K1 in combination with information including $Nonce_{AAC}$ and $Nonce_{REQ}$ and by using a negotiated or preset key derivation algorithm. The negotiated key derivation algorithm may be selected by the AAC for use according to Security $capabilities_{REQ}$ sent by the REQ.

It should be noted that in the embodiment in FIG. 2, the REQ and the AAC may also generate a message integrity check key. An implementation manner in which the REQ and the AAC each generate a message integrity check key is the same as the implementation manner illustrated in the embodiment in FIG. 2 in which the REQ and the AAC each generate a message encryption key. For example, the AAC may use the key derivation algorithm to derive a string of key data as in the embodiment in FIG. 2. The key data can be used as the message encryption key, and can also be used as the message integrity check key. Alternatively, some key data in the key data is used as the message encryption key, and the rest is used as the message integrity check key. The AAC may also use the key derivation algorithm to derive two identical or different strings of key data separately as in the embodiment in FIG. 2. One string is used as the message encryption key, and the other string is used as the message integrity check key. The REQ may use the key derivation algorithm to derive a string of key data as in the embodiment in FIG. 2. The key data can be used as the message encryption key, and can also be used as the message integrity check key. Alternatively, some key data in the key data is used as the message encryption key, and the rest is used as the message integrity check key. The REQ may also use the key derivation algorithm to derive two identical or different strings of key data separately as in the embodiment in FIG. 2. One string is used as the message encryption key, and the other string is used as the message integrity check key.

Further provided in an embodiment of the present application is a method of using information exchange between an AAC and a REQ to determine a first authentication server and/or a second authentication server used in a current authentication process.

Please refer to FIG. 2. The AAC adds the identifier $ID_{AS\_AAC}$ of at least one authentication server trusted by the AAC to AACInit of S201, so that the REQ determines the identifier $ID_{AS\_REQ}$ of at least one authentication server trusted thereby according to $ID_{AS\_AAC}$. During specific implementation, the REQ selects the identifier of at least one authentication server trusted thereby from $ID_{AS\_ACC}$ as $ID_{AS\_REQ}$, and if selection fails, the REQ uses the identifier of at least one authentication server trusted thereby as $ID_{AS\_REQ}$ (successful selection corresponds to a non-roaming scenario, and failed selection corresponds to a roaming scenario), and adds $ID_{AS\_REQ}$ to REQInit of S203 to send the same to the AAC. In turn, the AAC may determine the first authentication server according to $ID_{AS\_AAC}$ and $ID_{AS\_REQ}$. For example, the AAC may determine whether the identifier of at least one identical authentication server is present in $ID_{AS\_REQ}$ and $ID_{AS\_ACC}$, and if so, i.e., in a non-roaming scenario, the AAC determines, from the identifier of the at least one authentication server trusted by both the REQ and the AAC, the first authentication server participating in identity authentication, or if not, i.e., in a roaming scenario, the AAC needs to determine, according to $ID_{AS\_AAC}$, the first authentication server AS-AAC participating in identity authentication, and send $ID_{AS\_REQ}$ to AS-AAC, so that AS-AAC determines the second authentication server AS-REQ according to $ID_{AS\_REQ}$.

In another implementation manner, the AAC does not need to send $ID_{AS\_AAC}$ to the REQ, and the REQ adds the identifier $ID_{AS\_REQ}$ of at least one authentication server trusted thereby to REQInit of S203. A specific implementation manner in which the first authentication server and/or the second authentication server participating in the identity authentication process is determined according to $ID_{AS\_REQ}$ and the identifier $ID_{AS\_AAC}$ of the authentication server trusted by the AAC is the same as the preceding implementation manner.

An authentication server trusted by the REQ and an authentication server trusted by the AAC may be the same or different, so that the authentication server trusted by the REQ and the authentication server trusted by the AAC being the same is a non-roaming scenario, and the authentication server trusted by the REQ and the authentication server trusted by the AAC being different is a roaming scenario.

For ease of description, in the following embodiments of FIG. 3 to FIG. 6, a verification result acquired by verifying the legality of $Cert_{REQ}$ is represented by $Res_{REQ}$, and the identity authentication result information of the REQ may be represented by $Pub_{REQ}$.

Figure 3:
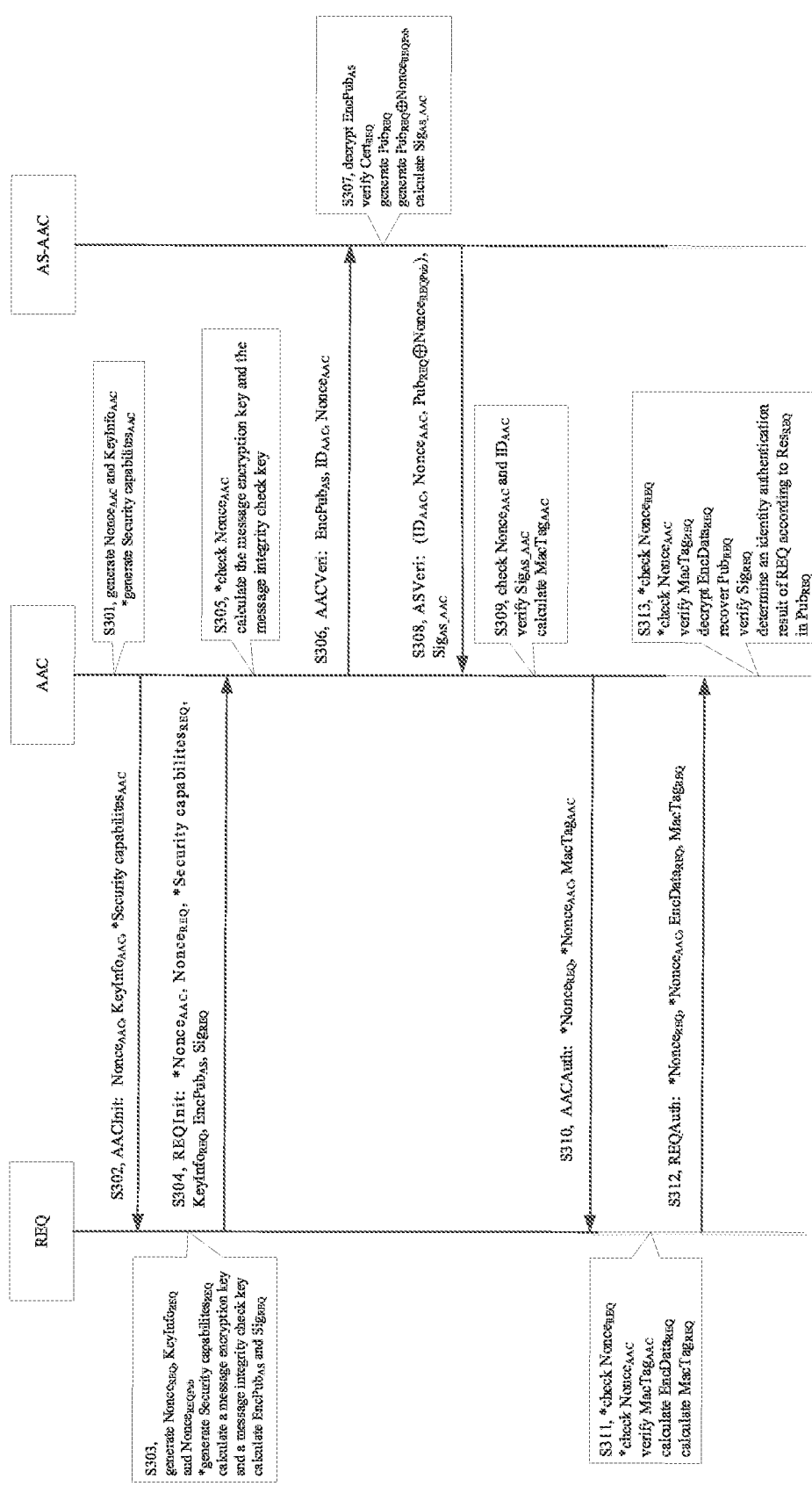
FIG. 3 is a schematic diagram of an identity authentication method in a non-roaming scenario according to an embodiment of the present application, where "*" represents an optional field or an optional operation.

Referring to FIG. 3, FIG. 3 is an embodiment of an identity authentication method in a non-roaming scenario. An authentication server trusted by both a REQ and an AAC may be represented by AS-AAC (or AS-REQ). In this embodiment, a message encryption key negotiation process between a REQ and an AAC is fused in parallel to an identity authentication process, thereby facilitating project implementation. The AAC verifies a digital signature $Sig_{REQ}$ of the REQ. The method includes the following operations.

At S301, an AAC generates $Nonce_{AAC}$ and $KeyInfo_{AAC}$, and generating Security capabilities$_{AAC}$ as desired.

At S302, the AAC sends a key request message AACInit to a REQ.

AACInit includes $Nonce_{AAC}$, $KeyInfo_{AAC}$, and Security capabilities$_{AAC}$. Security capabilities$_{AAC}$ is an optionally field, represents security capability parameter information supported by the AAC, and includes an identity authentication suite, one or more symmetric encryption algorithms, one or more integrity check algorithms, and/or one or more key derivation algorithms etc., supported by the AAC (hereinafter the same).

At S303, the REQ generates $Nonce_{REQ}$, $KeyInfo_{REQ}$, and $Nonce_{REQPub}$, generates Security capabilities$_{REQ}$ as desired, performs key exchange calculation according to a temporary private key corresponding to $KeyInfo_{REQ}$ and a temporary public key included in $KeyInfo_{AAC}$ to generate a first key K1, calculates a message encryption key and a message integrity check key according to K1 in combination with $Nonce_{AAC}$, $Nonce_{REQ}$, and other information (the other information used by the REQ and the AAC is the same, and is optional, such as a specific string, etc.) and by using a negotiated or preset key derivation algorithm, and uses a public key of an encryption certificate to calculate identity information ciphertext $EncPub_{AS}$ of the REQ; and calculates $Sig_{REQ}$.

Security capabilities$_{REQ}$ is an optional field, and represents selection of a specific security policy performed by the REQ according to Security capabilities$_{AAC}$, i.e., an identity authentication method, a symmetric encryption algorithm, an integrity check algorithm, and/or a key derivation algorithm, etc., determined and used by the REQ (hereinafter the same). Whether the REQ generates Security capabilities$_{REQ}$ dependent on whether AACInit sent by the AAC to the REQ carries Security capabilities$_{AAC}$.

At S304, the REQ sends an identity ciphertext message REQInit to the AAC.

REQInit includes $Nonce_{AAC}$, $Nonce_{REQ}$, Security capabilities$_{REQ}$, $KeyInfo_{REQ}$, $EncPub_{AS}$, and $Sig_{REQ}$. $Nonce_{AAC}$ and Security capabilities$_{REQ}$ are optional fields, and $Nonce_{AAC}$ shall be equal to a corresponding field in AACInit. Encryption data of $EncPub_{AS}$ includes $Cert_{REQ}$ and a protection nonce $Nonce_{REQPub}$. To-be-signed data of $Sig_{REQ}$ includes other fields before $Sig_{REQ}$ in REQInit. For example, when REQInit includes sequentially $Nonce_{AAC}$, $Nonce_{REQ}$, Security capabilities$_{REQ}$, $KeyInfo_{REQ}$, $EncPub_{AS}$, and $Sig_{REQ}$, the to-be-signed data of $Sig_{REQ}$ includes $Nonce_{AAC}$, $Nonce_{REQ}$, Security capabilities$_{REQ}$, $KeyInfo_{REQ}$, and $EncPub_{AS}$. Furthermore, when REQInit does not include the $Nonce_{AAC}$ field, the to-be-signed data of $Sig_{REQ}$ further includes the $Nonce_{AAC}$ field in AACInit. In the embodiment of the present application, an object to be encrypted is referred to as encryption data, and an object to be signed is referred to as to-be-signed data.

At S305, the AAC upon receiving REQInit, performs the following operations (if not specified otherwise or if not due to a logical relationship, actions numbered (1) (2) . . . , herein do not have a necessary order due to the numbers, which is the case hereinbefore and hereinafter), including:
(1) if $Nonce_{AAC}$ is present in REQInit, checking whether $Nonce_{AAC}$ is the same as $Nonce_{AAC}$ generated by the AAC, and if not, discarding REQInit;
(2) performing key exchange calculation according to the temporary private key corresponding to $KeyInfo_{AAC}$ and the temporary public key included in $KeyInfo_{REQ}$, and generating the first key K1, calculating the message encryption key and the message integrity check key according to K1 in combination with $Nonce_{AAC}$, $Nonce_{REQ}$, and other information (the other information used by the AAC and the REQ is the same, and is optional, such as a specific string, etc.) and by using the negotiated or preset key derivation algorithm. Certainly, this operation may also be performed when the AAC needs to use the message encryption key and/or the message integrity check key subsequently.

At S306, the AAC sends a first authentication request message AACVeri to AS-AAC.

AACVeri includes $EncPub_AS$, $ID_{AAC}$, and $Nonce_{AAC}$. $EncPub_{AS}$ shall be equal to a corresponding field in REQInit.

At S307, AS-AAC upon receiving AACVeri, performs the following operations:
(1) using a private key corresponding to the encryption certificate to decrypt $EncPub_AS$ to acquire $Cert_{REQ}$ and $Nonce_{REQPub}$;
(2) verifying the legality of $Cert_{REQ}$ to acquire $Res_{REQ}$, and generating identity authentication result information $Pub_{REQ}$ according to information including $Cert_{REQ}$ and $Res_{REQ}$;
(3) performing an XOR operation on $Pub_{REQ}$ and $Nonce_{REQPub}$ to acquire an authentication result information ciphertext $Pub_{REQ} \oplus Nonce_{REQPub}$; and
(4) calculating a digital signature $Sig_{AS\_AAC}$.

At S308, AS-AAC sends a first authentication response message ASVeri to the AAC.

ASVeri includes $ID_{AAC}$, $Nonce_{AAC}$, $Pub_{REQ} \oplus Nonce_{REQPub}$, and $Sig_{AS\_AAC}$. $ID_{AAC}$ and $Nonce_{AAC}$ shall be equal to corresponding fields in AACVeri. To-be-signed data of $Sig_{AS\_AAC}$ includes $ID_{AAC}$, $Nonce_{AAC}$, and $Pub_{REQ} \oplus Nonce_{REQPub}$.

At S309, the AAC upon receiving ASVeri, performs the following operations:
(1) checking whether $ID_{AAC}$ and $Nonce_{AAC}$ are respectively the same as the identifier $ID_{AAC}$ of the AAC and $Nonce_{AAC}$ generated by the AAC;
(2) using a public key of AS-AAC to verify $Sig_{AS\_AAC}$; and
(3) if both the above checking and verification are successful, calculating a first message integrity check code $MacTag_{AAC}$; or if any operation in the above checking or verification is not successful, discarding ASVeri immediately.

At S310, the AAC sends an authentication result recovery request message AACAuth to the REQ.

AACAuth includes $Nonce_{REQ}$, $Nonce_{AAC}$, and $MacTag_{ACC}$. $Nonce_{REQ}$ and $Nonce_{AAC}$ are optional fields, and shall be respectively equal to $Nonce_{REQ}$ in REQInit and $Nonce_{AAC}$ generated by the AAC. A calculation process of $MacTag_{AAC}$ includes: using the message integrity check key and the integrity check algorithm to perform calculation on information including fields other than $MacTag_{AAC}$ in AACAuth and generate $MacTag_{AAC}$.

At S311, the REQ upon receiving AACAuth, performs the following operations:
(1) if $Nonce_{REQ}$ and/or $Nonce_{AAC}$ is present in AACAuth, checking whether $Nonce_{REQ}$ is the same as $Nonce_{REQ}$ generated by the REQ, and/or checking whether $Nonce_{AAC}$ is the same as $Nonce_{AAC}$ in received AACInit;
(2) verifying $MacTag_{AAC}$,
a verification process including: using the message integrity check key and the integrity check algorithm to perform calculation locally on information including fields other than $MacTag_{AAC}$ in AACAuth, and generating $MacTag_{AAC}$ (the calculation manner is the same as the manner in which the AAC calculates $MacTag_{AAC}$), and comparing calculated $MacTag_{AAC}$ with $MacTag_{AAC}$ in received AACAuth;
(3) if both the above checking and verification are successful, using the message encryption key and the symmetric encryption algorithm to calculate a protection nonce ciphertext $EncData_{REQ}$, or if any operation in the above checking or verification is not successful, discarding AACAuth immediately;
(4) calculating a second message integrity check code $MacTag_{REQ}$.

At S312, the REQ sends an authentication result recovery message REQAuth to the AAC.

REQAuth includes $Nonce_{REQ}$, $Nonce_{AAC}$, $EncData_{REQ}$, and $MacTag_{REQ}$. $Nonce_{REQ}$ and $Nonce_{ACC}$ are optional fields, and shall be respectively equal to $Nonce_{REQ}$ generated by the REQ and $Nonce_{AAC}$ in AACInit. Encryption data of $EncData_{REQ}$ includes $Nonce_{REQPub}$. A calculation process of $MacTag_{REQ}$ includes: using the message integrity check key and the integrity check algorithm to perform calculation on information including fields other than $MacTag_{REQ}$ in REQAuth and generating $MacTag_{REQ}$.

At S313, the AAC upon receiving REQAuth, performs the following operations:
(1) if $Nonce_{REQ}$ and/or $Nonce_{AAC}$ is present in REQAuth, checking whether $Nonce_{REQ}$ is the same as $Nonce_{REQ}$ in received REQInit, and/or checking whether $Nonce_{AAC}$ is the same as $Nonce_{AAC}$ generated by the AAC;
(2) verifying $MacTag_{REQ}$,
a verification process including: using the message integrity check key and the integrity check algorithm to perform calculation locally on information including fields other than $MacTag_{REQ}$ in REQAuth, and generating $MacTag_{REQ}$ (the calculation manner is the same as the manner in which the REQ calculates $MacTag_{REQ}$), and comparing calculated $MacTag_{REQ}$ with $MacTag_{REQ}$ in received REQAuth;
(3) using the message encryption key and the symmetric encryption algorithm to decrypt $EncData_{REQ}$ to acquire $Nonce_{REQPub}$;
(4) performing an XOR operation on $Nonce_{REQPub}$ and $Pub_{REQ} \oplus Nonce_{REQPub}$ to recover $Pub_{REQ}$;
(5) using $Cert_{REQ}$ in $Pub_{REQ}$ to verify $Sig_{REQ}$ in REQInit; and
(6) after both the above checking and verification are successful, determining an identity authentication result of the REQ according to $Res_{REQ}$ in $Pub_{REQ}$, and if any operation in the above checking or verification is not successful, discarding REQAuth immediately.

It should be noted that REQInit in S304 may not include $Sig_{REQ}$, and $Sig_{REQ}$ is added to REQAuth of S312. That is, in S312, the REQ first performs calculation on to-be-signed data including $Nonce_{REQ}$, $Nonce_{AAC}$, and $EncData_{REQ}$ in REQAuth and generates $Sig_{REQ}$. In this case, $Sig_{REQ}$ verified by the AAC in S313 is $Sig_{REQ}$ in REQAuth of S312.

Figure 4:
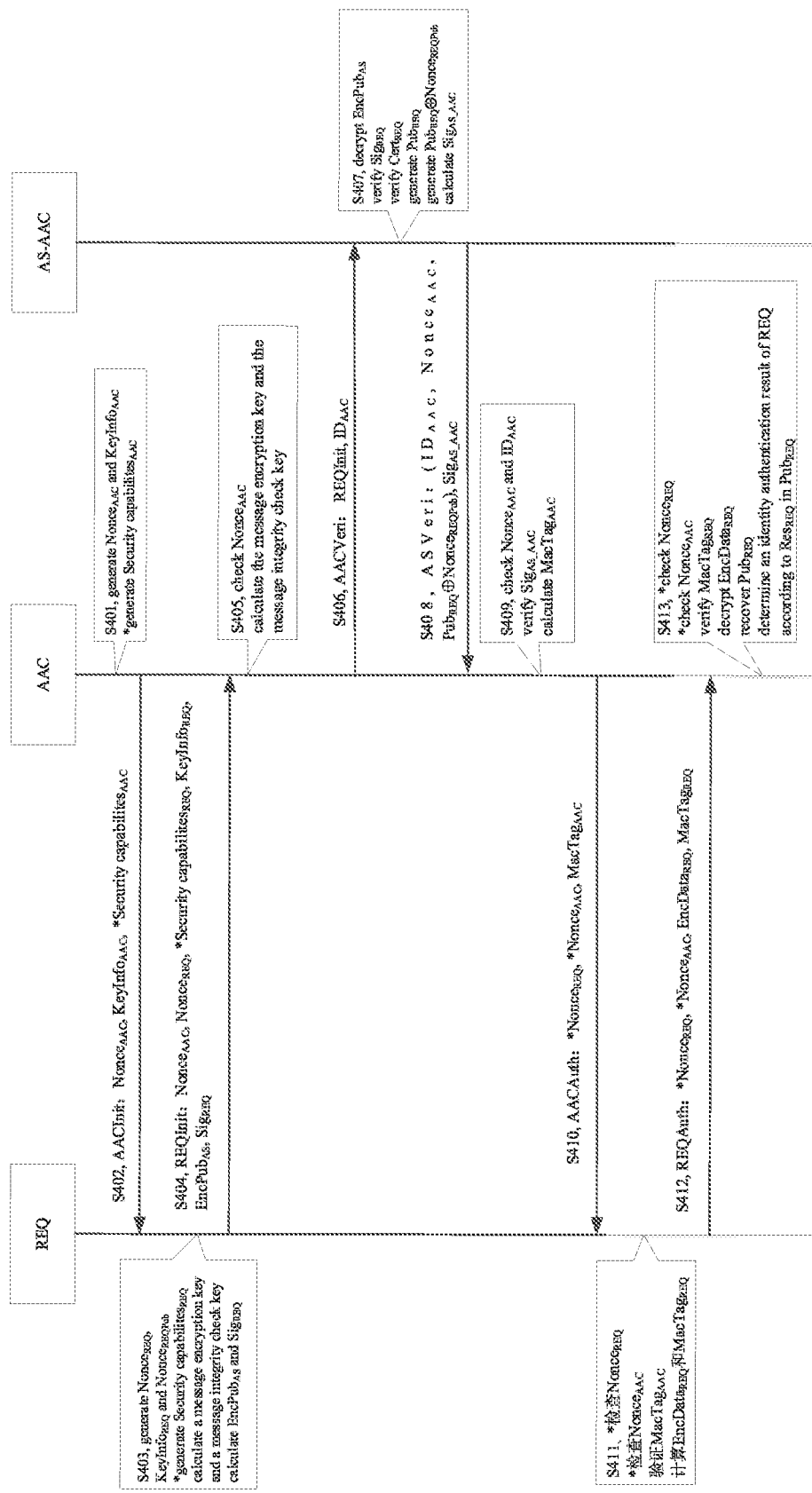
FIG. 4 is a schematic diagram of another identity authentication method in a non-roaming scenario according to an embodiment of the present application, where "*" represents an optional field or an optional operation.

Referring to FIG. 4, FIG. 4 is another embodiment of an identity authentication method in a non-roaming scenario. An authentication server trusted by both a REQ and an AAC may be represented by AS-AAC (or AS-REQ). In this embodiment, a message encryption key negotiation process between a REQ and an AAC is fused in parallel to an identity authentication process, thereby facilitating project implementation. AS-AAC (which may also be represented by AS-REQ) verifies $Sig_{REQ}$. The method includes the following operations.

At S401, an AAC generates $Nonce_{AAC}$ and $KeyInfo_{AAC}$, and generates Security capabilities$_{AAC}$ as desired.

At S402, the AAC sends a key request message AACInit to a REQ.

AACInit includes $Nonce_{AAC}$, $KeyInfo_{AAC}$, and Security capabilities$_{AAC}$. Security capabilities$_{AAC}$ is an optional field.

At S403, the REQ generates $Nonce_{REQ}$, $KeyInfo_{REQ}$, and $Nonce_{REQPub}$, generates Security capabilities$_{REQ}$ as desired, performs key exchange calculation according to a temporary private key corresponding to $KeyInfo_{REQ}$ and a temporary public key included in $KeyInfo_{AAC}$ to generate a first key K1, calculates a message encryption key and a message integrity check key according to K1 in combination with $Nonce_{AAC}$, $Nonce_{REQ}$, and other information (the other information used by the REQ and the AAC is the same, and is optional, such as a specific string, etc.) and by using a negotiated or preset key derivation algorithm, and uses a public key of an encryption certificate to calculate identity information ciphertext $EncPub_{AS}$ of the REQ; and calculates $Sig_{REQ}$.

At S404, the REQ sends an identity ciphertext message REQInit to the AAC.

REQInit includes $Nonce_{AAC}$, $Nonce_{REQ}$, Security capabilities$_{REQ}$, $KeyInfo_{REQ}$, $EncPub_{AS}$, and $Sig_{REQ}$. Security capabilities$_{REQ}$ is an optional field, and $Nonce_{AAC}$ shall be equal to a corresponding field in AACInit. Encryption data of $EncPub_{AS}$ includes $Cert_{REQ}$ and a protection nonce $Nonce_{REQPub}$. To-be-signed data of $Sig_{REQ}$ includes other fields before $Sig_{REQ}$ in REQInit.

At S405, the AAC upon receiving REQInit, performs the following operations:
(1) checking whether $Nonce_{AAC}$ in REQInit is the same as $Nonce_{AAC}$ generated by the AAC, and if not, discarding REQInit; and
(2) performing key exchange calculation according to a temporary private key corresponding to $KeyInfo_{AAC}$ and a temporary public key included in $KeyInfo_{REQ}$, and generating the first key K1, calculating the message encryption key and the message integrity check key according to K1 in combination with $Nonce_{AAC}$, $Nonce_{REQ}$, and other information (the other information used by the AAC and the REQ is the same, and is optional, such as a specific string, etc.) and by using the negotiated or preset key derivation algorithm.

At S406, the AAC sends a first authentication request message AACVeri to AS-AAC.

AACVeri includes REQInit and $ID_{AAC}$.

At S407, AS-AAC upon receiving AACVeri, performs the following operations:
(1) using a private key corresponding to the encryption certificate to decrypt $EncPub_{AS}$ in REQInit to acquire $Cert_{REQ}$ and $Nonce_{REQPub}$;
(2) using $Cert_{REQ}$ to verify $Sig_{REQ}$, and if verification is not successful, discarding AACVeri;
(3) verifying the legality of $Cert_{REQ}$ to acquire $Res_{REQ}$, generating $Pub_{REQ}$ according to information including $Res_{REQ}$, performing an XOR operation on $Pub_{REQ}$ and $Nonce_{REQPub}$ to acquire an authentication result information ciphertext $Pub_{REQ} \oplus Nonce_{REQPub}$, and
(4) calculating a digital signature $Sig_{AS\_AAC}$.

At S408, AS-AAC sends a first authentication response message ASVeri to the AAC.

ASVeri includes $ID_{AAC}$, $Nonce_{AAC}$, $Pub_{REQ} \oplus Nonce_{REQPub}$, and $Sig_{AS\_AAC}$. $ID_{AAC}$ and $Nonce_{AAC}$ shall be respectively equal to corresponding fields in AACVeri. To-be-signed data of $Sig_{AS\_AAC}$ includes $ID_{AAC}$, $Nonce_{AAC}$, and $Pub_{REQ} \oplus Nonce_{REQPub}$.

At S409, the AAC upon receiving ASVeri, performs the following operations:
(1) checking whether $ID_{AAC}$ and $Nonce_{AAC}$ are respectively the same as the identifier $ID_{AAC}$ of the AAC and $Nonce_{AAC}$ generated by the AAC;
(2) using a public key of AS-AAC to verify $Sig_{AS\_AAC}$; and
(3) if both the above checking and verification are successful, calculating a first message integrity check code $MacTag_{AAC}$; or if any operation in the above checking or verification is not successful, discarding ASVeri immediately.

At S410, the AAC sends an authentication result recovery request message AACAuth to the REQ.

AACAuth includes $Nonce_{REQ}$, $Nonce_{AAC}$, and $MacTag_{AAC}$. $Nonce_{REQ}$ and $Nonce_{AAC}$ are optional fields, and shall be respectively equal to $Nonce_{REQ}$ in REQInit and $Nonce_{AAC}$ generated by the AAC. A calculation process of $MacTag_{AAC}$ is as described in the embodiment of FIG. 3.

At S411, the REQ upon receiving AACAuth, performs the following operations:
(1) if $Nonce_{REQ}$ and/or $Nonce_{AAC}$ is present in AACAuth, checking whether $Nonce_{REQ}$ is the same as $Nonce_{REQ}$ generated by the REQ, and/or checking whether $Nonce_{AAC}$ is the same as $Nonce_{ACC}$ in received AACInit;
(2) verifying $MacTag_{AAC}$, the verification process being as described in the embodiment of FIG. 3;
(3) if both the above checking and verification are successful, using the message encryption key and the symmetric encryption algorithm to calculate a protection nonce ciphertext $EncData_{REQ}$, or if any operation in the above checking or verification is not successful, discarding AACAuth immediately;
(4) calculating a second message integrity check code $MacTag_{REQ}$.

At S412, the REQ sends an authentication result recovery message REQAuth to the AAC.

REQAuth includes $Nonce_{REQ}$, $Nonce_{AAC}$, $EncData_{REQ}$, and $MacTag_{REQ}$. $Nonce_{REQ}$ and $Nonce_{AAC}$ are optional fields, and shall be respectively equal to $Nonce_{REQ}$ generated by the REQ and $Nonce_{AAC}$ in AACInit. Encryption data of $EncData_{REQ}$ includes $Nonce_{REQPub}$. A calculation process of $MacTag_{REQ}$ is as described in the embodiment of FIG. 3.

At S413, the AAC upon receiving REQAuth, performs the following operations:
(1) if $Nonce_{REQ}$ and/or $Nonce_{ACC}$ is present in REQAuth, checking whether $Nonce_{REQ}$ is the same as $Nonce_{REQ}$ in received REQInit, and/or checking whether $Nonce_{AAC}$ is the same as $Nonce_{AAC}$ generated by the AAC;
(2) verifying $MacTag_{REQ}$, the verification process being as described in the embodiment of FIG. 3;
(3) after the above checking and verification are successful, using the message encryption key and the symmetric encryption algorithm to decrypt $EncData_{REQ}$ to acquire $Nonce_{REQPub}$, or if any operation in the above checking or verification is not successful, discarding REQAuth immediately;

(4) performing an XOR operation on $Nonce_{REQPub}$ and $Pub_{REQ} \oplus Nonce_{REQPub}$ to recover $Pub_{REQ}$; and (5) determining an identity authentication result of the REQ according to $Res_{REQ}$ in $Pub_{REQ}$.

Figure 5:
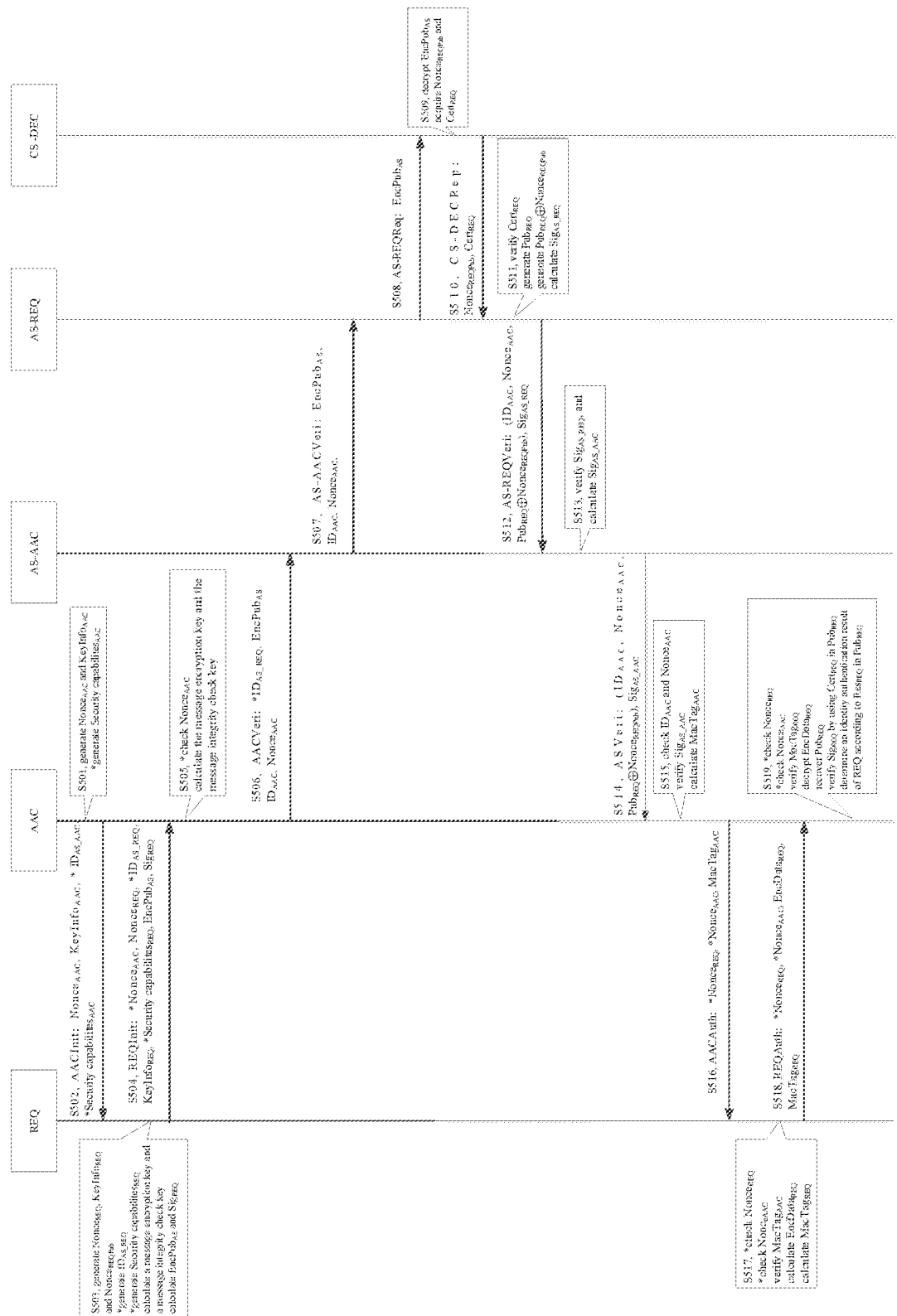
FIG. 5 is a schematic diagram of an identity authentication method in a roaming scenario according to an embodiment of the present application, where "*" represents an optional field or an optional operation.

Referring to FIG. 5, FIG. 5 is an embodiment of an identity authentication method in a roaming scenario. In this embodiment, a message encryption key negotiation process between a REQ and an AAC is fused in parallel to an identity authentication process, thereby facilitating project implementation. The AAC verifies $Sig_{REQ}$. The method includes the following operations.

At S501, an AAC generates $Nonce_{AAC}$ and $KeyInfo_{AAC}$, and generates Security capabilities$_{AAC}$ as desired.

At S502, the AAC sends a key request message AACInit to a REQ.

AACInit includes $Nonce_{AAC}$, $KeyInfo_{AAC}$, $ID_{AS\_AAC}$, and Security capabilities$_{AAC}$. $ID_{AS\_AAC}$ and Security capabilities$_{AAC}$ are optional fields. $ID_{AS\_AAC}$ represents the identifier of at least one authentication server trusted by the AAC, and is used to allow the REQ to determine, according to $ID_{AS\_AAC}$, whether a mutually trusted authentication server exists (hereinafter the same).

At S503, the REQ generates $Nonce_{REQ}$, $KeyInfo_{REQ}$, and $Nonce_{REQPub}$, generates $ID_{AS\_REQ}$ and Security capabilities$_{REQ}$ as desired, performs key exchange calculation according to a temporary private key corresponding to $KeyInfo_{REQ}$ and a temporary public key included in $KeyInfo_{AAC}$ to generate a first key K1, calculates a message encryption key and a message integrity check key according to K1 in combination with $Nonce_{AAC}$, $Nonce_{REQ}$, and other information (the other information used by the REQ and the AAC is the same, and is optional, such as a specific string, etc.) and by using a negotiated or preset key derivation algorithm, and uses a public key of an encryption certificate to calculate identity information ciphertext $EncPub_{AS}$ of the REQ; and calculates $Sig_{REQ}$.

$ID_{AS\_REQ}$ and Security capabilities$_{REQ}$ are optional fields. $ID_{AS\_REQ}$ represents the identifier of at least one authentication server trusted by the REQ. When $ID_{AS\_AAC}$ is present in AACInit, the REQ selects, as best as possible from authentication servers trusted thereby, at least one authentication server, which is the same as that in $ID_{AS\_AAC}$, as $ID_{AS\_REQ}$, and if selection fails, uses at least one authentication server trusted thereby as $ID_{AS\_REQ}$; when $ID_{AS\_AAC}$ is not present in AACInit, the REQ uses at least one authentication server trusted thereby as $ID_{AS\_REQ}$ (hereinafter the same).

At S504, the REQ sends an identity ciphertext message REQInit to the AAC.

REQInit includes $Nonce_{AAC}$, $Nonce_{REQ}$, $ID_{AS\_REQ}$, $KeyInfo_{REQ}$, Security capabilities$_{REQ}$, $EncPub_{AS}$, and $Sig_{REQ}$. $Nonce_{AAC}$, $ID_{AS\_REQ}$, and Security capabilities$_{REQ}$ are optional fields, and $Nonce_{AAC}$ shall be equal to a corresponding field in AACInit. Encryption data of $EncPub_{AS}$ includes $Cert_{REQ}$ and a protection nonce $Nonce_{REQPub}$. To-be-signed data of $Sig_{REQ}$ includes other fields before $Sig_{REQ}$ in REQInit. When REQInit does not include $Nonce_{AAC}$, the to-be-signed data of $Sig_{REQ}$ further includes the $Nonce_{AAC}$ field in AACInit.

At S505, the AAC upon receiving REQInit, performs the following operations:

(1) if $Nonce_{AAC}$ is present in REQInit, checking whether $Nonce_{AAC}$ is the same as $Nonce_{AAC}$ generated by the AAC, and if not, discarding REQInit;

(2) performing key exchange calculation according to a temporary private key corresponding to $KeyInfo_{AAC}$ and a temporary public key included in $KeyInfo_{REQ}$ and generating the first key K1, and calculating the message encryption key and the message integrity check key according to K1 in combination with $Nonce_{AAC}$, $Nonce_{REQ}$, and other information (the other information used by the AAC and the REQ is the same, and is optional, such as a specific string, etc.) and by using the negotiated or preset key derivation algorithm; and (3) if REQInit carries $ID_{AS}$ REQ and AACInit carries $ID_{AS}$ AAC, determining, by the AAC, whether the identifier of at least one identical authentication server is present in $ID_{AS\_REQ}$ and $ID_{AS\_AAC}$, herein if so, i.e., in a non-roaming scenario, the AAC determines, from the identifier of the at least one authentication server trusted by both the REQ and the AAC, a first authentication server participating in identity authentication, or if not, i.e., in a roaming scenario, the AAC needs to determine, according to $ID_{AS\_AAC}$, a first authentication server AS-AAC participating in identity authentication, and send $ID_{AS\_REQ}$ to AS-AAC, so that AS-AAC determines a second authentication server AS-REQ according to $ID_{AS\_REQ}$; or, if REQInit carries $ID_{AS\_REQ}$, but AACInit does not carry $ID_{AS\_AAC}$, determining, by the AAC, whether the identifier of at least one identical authentication server is present in $ID_{AS\_REQ}$ and authentication servers trusted by the AAC, herein if so, i.e., in a non-roaming scenario, the AAC determines from the identifier of the at least one authentication server trusted by both the REQ and the AAC, a first authentication server participating in identity authentication, or if not, i.e., in a roaming scenario, the AAC needs to determine, according to the authentication servers trusted thereby, a first authentication server AS-AAC participating in identity authentication, and send $ID_{AS\_REQ}$ to AS-AAC, so that AS-AAC determines a second authentication server AS-REQ according to $ID_{AS\_REQ}$.

It should be noted that the result determined in this embodiment is a roaming scenario.

At S506, the AAC sends a first authentication request message AACVeri to AS-AAC.

AACVeri includes $ID_{AS\_REQ}$, $EncPub_{AS}$, $ID_{AAC}$, and $Nonce_{ACC}$. $ID_{AS\_REQ}$ is an optional field, and allows AS-AAC to determine, according to $ID_{AS}$ REQ, the second authentication server used in this authentication process. In addition, $ID_{AS\_REQ}$ and $EncPub_{AS}$ shall be equal to corresponding fields in REQInit. If $ID_{AS\_REQ}$ is present in AACVeri, AS-AAC determines the second authentication server AS-REQ according to $ID_{AS\_REQ}$. If $ID_{AS\_REQ}$ is not present in AACVeri, it is indicated that AS-AAC has determined and knows AS-REQ.

At S507, AS-AAC upon receiving AACVeri, sends a second authentication request message AS-AACVeri to AS-REQ.

AS-AACVeri includes $EncPub_{AS}$, $ID_{AAC}$, and $Nonce_{AAC}$. Fields in AS-AACVeri are all derived from AACVeri.

At S508, AS-REQ upon receiving AS-AACVeri, sends a decryption request message AS-REQReq to a certificate server-decrypt (CS-DEC).

AS-REQReq includes $EncPub_{AS}$. $EncPub_{AS}$ shall be equal to a corresponding field in AS-AACVeri.

At S509, the CS-DEC upon receiving AS-REQReq, uses private key corresponding to the encryption certificate to decrypt $EncPub_{AS}$ to acquire $Cert_{REQ}$ and $Nonce_{REQPub}$.

At S510, the CS-DEC sends a decryption response message CS-DECRep to AS-REQ.

CS-DECRep includes $Cert_{REQ}$ and $Nonce_{REQPub}$ acquired by means of decryption. CS-DEC may be an independent apparatus having an interactive and trust relationship with AS-REQ, or may be integrated in AS-REQ. When CS-DEC is integrated in AS-REQ, AS-REQ decrypts $EncPub_{AS}$ directly to acquire $Cert_{REQ}$ and $Nonce_{REQPub}$.

At S511, AS-REQ upon receiving CS-DECRep, performs the following operations:

(1) verifying the legality of $Cert_{REQ}$ to acquire $Res_{REQ}$, and generating $Pub_{REQ}$ according to information including $Cert_{REQ}$ and $Res_{REQ}$;

(2) performing an XOR operation on $Pub_{REQ}$ and $Nonce_{REQPub}$ to acquire an authentication result information ciphertext $Pub_{REQ} \oplus Nonce_{REQPub}$, and (3) calculating a digital signature $Sig_{AS\_REQ}$.

At S512, AS-REQ sends a second authentication response message AS-REQVeri to AS-AAC.

AS-REQVeri includes $ID_{AAC}$, $Nonce_{AAC}$, $Pub_{REQ} \oplus Nonce_{REQPub}$, and $Sig_{AS\_REQ}$. $ID_{AAC}$ and $Nonce_{AAC}$ shall be respectively equal to corresponding fields in AS-AACVeri, and $Nonce_{REQPub}$ shall be equal to a corresponding field in CS-DECRep. To-be-signed data of $Sig_{AS\_REQ}$ includes $ID_{AAC}$, $Nonce_{AAC}$, and $Pub_{REQ} \oplus Nonce_{REQPub}$.

At S513, AS-AAC upon receiving AS-REQVeri, performs the following operations:

(1) using a public key of AS-REQ to verify $Sig_{AS\_REQ}$, and if verification is not successful, discarding AS-REQVeri; and (2) calculating a digital signature $Sig_{AS\_AAC}$.

At S514, AS-AAC sends a first authentication response message ASVeri to the AAC.

ASVeri includes $ID_{AAC}$, $Nonce_{AAC}$, $Pub_{REQ} \oplus Nonce_{REQPub}$, and $Sig_{AS\_AAC}$. $ID_{AAC}$, $Nonce_{AAC}$, and $Pub_{REQ} \oplus Nonce_{REQPub}$ shall be respectively equal to corresponding fields in AS-REQVeri. To-be-signed data of $Sig_{AS\_AAC}$ includes $ID_{AAC}$, $Nonce_{AAC}$, and $Pub_{REQ} \oplus Nonce_{REQPub}$.

At S515, the AAC upon receiving ASVeri, performs the following operations:

(1) checking whether $ID_{AAC}$ and $Nonce_{AAC}$ are respectively the same as the identifier $ID_{AAC}$ of the AAC and $Nonce_{AAC}$ generated by the AAC;

(2) using a public key of AS-AAC to verify $Sig_{AS\_AAC}$; and (3) if both the above checking and verification are successful, calculating a first message integrity check code $MacTag_{AAC}$; or if any operation in the above checking or verification is not successful, discarding ASVeri immediately.

At S516, the AAC sends an authentication result recovery request message AACAuth to the REQ.

AACAuth includes $Nonce_{REQ}$, $Nonce_{AAC}$, and $MacTag_{AAC}$. $Nonce_{REQ}$ and $Nonce_{AAC}$ are optional fields, and shall be respectively equal to $Nonce_{REQ}$ in REQInit and $Nonce_{AAC}$ generated by the AAC. A calculation process of $MacTag_{AAC}$ is as described in the embodiment of FIG. 3.

At S517, the REQ upon receiving AACAuth, performs the following operations:

(1) if $Nonce_{REQ}$ and/or $Nonce_{AAC}$ is present in AACAuth, checking whether $Nonce_{REQ}$ is the same as $Nonce_{REQ}$ generated by the REQ, and/or checking whether $Nonce_{AAC}$ is the same as $Nonce_{AAC}$ in received AACInit;

(2) verifying $MacTag_{ACC}$, the verification process being as described in the embodiment of FIG. 3;

(3) if both the above checking and verification are successful, using the message encryption key and the symmetric encryption algorithm to calculate a protection nonce ciphertext $EncData_{REQ}$, or if any operation in the above checking or verification is not successful, discarding AACAuth immediately;

(4) calculating a second message integrity check code $MacTag_{REQ}$.

At S518, the REQ sends an authentication result recovery message REQAuth to the AAC.

REQAuth includes $Nonce_{REQ}$, $Nonce_{AAC}$, $EncData_{REQ}$, and $MacTag_{REQ}$. $Nonce_{REQ}$ and $Nonce_{AAC}$ are optional fields, and shall be respectively equal to $Nonce_{REQ}$ generated by the REQ and $Nonce_{AAC}$ in AACInit. Encryption data of $EncData_{REQ}$ includes $Nonce_{REQPub}$. A calculation process of $MacTag_{REQ}$ is as described in the embodiment of FIG. 3.

At S519, the AAC upon receiving REQAuth, performs the following operations:

(1) if $Nonce_{REQ}$ and/or $Nonce_{AAC}$ is present in REQAuth, checking whether $Nonce_{REQ}$ is the same as $Nonce_{REQ}$ in received REQInit, and/or checking whether $Nonce_{AAC}$ is the same as $Nonce_{AAC}$ generated by the AAC;

(2) verifying $MacTag_{REQ}$, the verification process being as described in the embodiment of FIG. 3;

(3) using the message encryption key and the symmetric encryption algorithm to decrypt $EncData_{REQ}$ to acquire $Nonce_{REQ}$ p b;

(4) performing an XOR operation on $Nonce_{REQPub}$ and $Pub_{REQ} \oplus Nonce_{REQPub}$ to recover $Pub_{REQ}$; and (5) using $Cert_{REQ}$ in $Pub_{REQ}$ to verify $Sig_{REQ}$ in REQInit; and (6) after both the above checking and verification are successful, determining an identity authentication result of the REQ according to $Res_{REQ}$ in $Pub_{REQ}$, and if any operation in the above checking or verification is not successful, discarding REQAuth immediately.

It should be noted that REQInit in S504 may not include $Sig_{REQ}$, and $Sig_{REQ}$ is added to REQAuth of S518. That is, in S518, the REQ first performs calculation on to-be-signed data including $Nonce_{REQ}$, $Nonce_{AAC}$, and $EncData_{REQ}$ in REQAuth and generates $Sig_{REQ}$. In this case, $Sig_{REQ}$ verified by the AAC in S519 is $Sig_{REQ}$ in REQAuth of S518.

Figure 6:
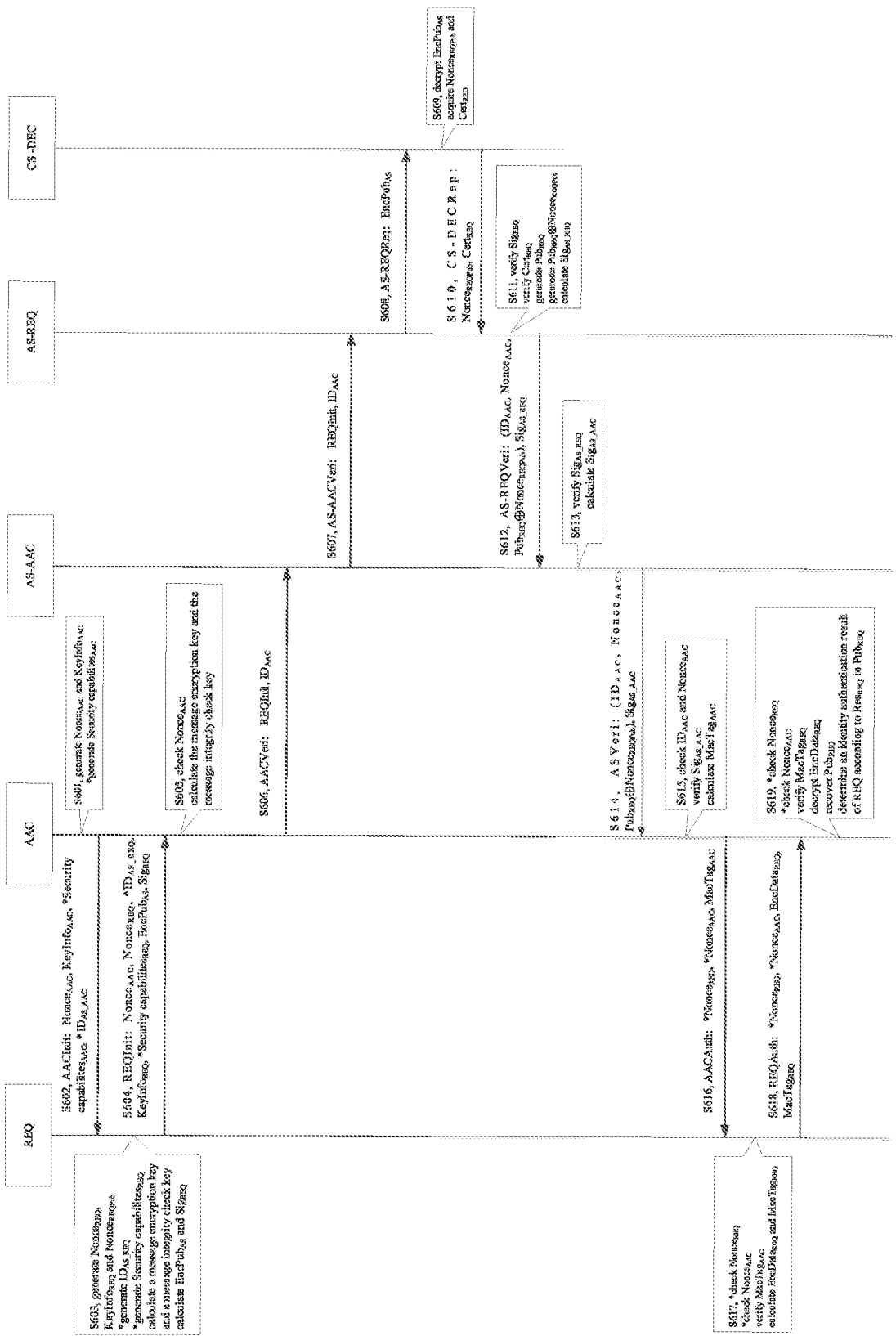
FIG. 6 is a schematic diagram of another identity authentication method in a roaming scenario according to an embodiment of the present application, where "*" represents an optional field or an optional operation.

Referring to FIG. 6, FIG. 6 is another embodiment of an identity authentication method in a roaming scenario. In this embodiment, a message encryption key negotiation process between a REQ and an AAC is fused in parallel to an identity authentication process, thereby facilitating project implementation. AS-REQ verifies $Sig_{REQ}$. The method includes the following operations.

At S601, an AAC generates $Nonce_{AAC}$ and $KeyInfo_{AAC}$, and generates Security capabilities$_{AAC}$ as desired.

At S602, the AAC sends a key request message AACInit to a REQ.

AACInit includes $Nonce_{AAC}$, $KeyInfo_{AAC}$, Security capabilities$_{AAC}$, and $ID_{AS\_AAC}$. $ID_{AS\_AAC}$ and Security capabilities$_{AAC}$ are optional fields.

At S603, the REQ generates $Nonce_{REQ}$, $KeyInfo_{REQ}$, and $Nonce_{REQPub}$, generates $ID_{AS\_REQ}$ and Security capabilities$_{REQ}$ as desired, performs key exchange calculation according to a temporary private key corresponding to $KeyInfo_{REQ}$ and a temporary public key included in $KeyInfo_{AAC}$ to generate a first key K1, calculates a message encryption key and a message integrity check key according to K1 in combination with $Nonce_{AAC}$, $Nonce_{REQ}$, and other information (the other information used by the REQ and the AAC is the same, and is optional, such as a specific string, etc.) and by using a negotiated or preset key derivation algorithm, and uses a public key of an encryption certificate to calculate identity information ciphertext $EncPub_{AS}$ of the REQ; and calculates $Sig_{REQ}$.

At S604, the REQ sends an identity ciphertext message REQInit to the AAC.

REQInit includes $Nonce_{AAC}$, $Nonce_{REQ}$, $ID_{AS\_REQ}$, $KeyInfo_{REQ}$, Security capabilities$_{REQ}$, $EncPub_AS$, and $Sig_{REQ}$. $ID_{AS\_REQ}$ and Security capabilities$_{REQ}$ are optional fields. $Nonce_{AAC}$ shall be equal to a corresponding field in AACInit. Encryption data of $EncPub_{AS}$ includes $Cert_{REQ}$ and a protection nonce $Nonce_{REQPub}$. To-be-signed data of $Sig_{REQ}$ includes other fields before $Sig_{REQ}$ in REQInit.

At S605, the AAC upon receiving REQInit, performs the following operations:
(1) checking whether $Nonce_{AAC}$ in REQInit is the same as $Nonce_{AAC}$ generated by the AAC, and if not, discarding REQInit;
(2) performing key exchange calculation according to a temporary private key corresponding to $KeyInfo_{AAC}$ and a temporary public key included in $KeyInfo_{REQ}$ and generating the first key K1, and calculating the message encryption key and the message integrity check key according to K1 in combination with $Nonce_{AAC}$, $Nonce_{REQ}$, and other information (the other information used by the AAC and the REQ is the same, and is optional, such as a specific string, etc.) and by using the negotiated or preset key derivation algorithm; and
(3) a method used by the AAC to determine AS-AAC being the same as the relevant description in Embodiment 5.

At S606, the AAC sends a first authentication request message AACVeri to AS-AAC.

AACVeri includes REQInit and $ID_{AAC}$.

At S607, AS-AAC upon receiving AACVeri, sends a second authentication request message AS-AACVeri to AS-REQ.

AS-AACVeri includes REQInit and $ID_{AAC}$. Fields in AS-AACVeri are all derived from AACVeri. A method used by AS-AAC to determine a second authentication server AS-REQ is the same as the relevant description in Embodiment 5.

At S608, AS-REQ upon receiving AS-AACVeri, sends a decryption request message AS-REQReq to a certificate server-decrypt (CS-DEC).

AS-REQReq includes $EncPub_{AS}$. $EncPub_{AS}$ shall be equal to a corresponding field in AS-AACVeri.

At S609, the CS-DEC upon receiving AS-REQReq, uses private key corresponding to the encryption certificate to decrypt $EncPub_{AS}$ to acquire $Cert_{REQ}$ and $Nonce_{REQPub}$.

At S610, the CS-DEC sends a decryption response message CS-DECRep to AS-REQ.

CS-DECRep includes $Cert_{REQ}$ and $Nonce_{REQPub}$ acquired by means of decryption.

At S611, AS-REQ upon receiving CS-DECRep, performs the following operations:
(1) using $Cert_{REQ}$ to verify $Sig_{REQ}$, and if verification is not successful, discarding CS-DECRep;
(2) verifying the legality of $Cert_{REQ}$ to acquire $Res_{REQ}$, and generating $Pub_{REQ}$ according to information including $Res_{REQ}$;
(3) performing an XOR operation on $Pub_{REQ}$ and $Nonce_{REQ}$ pw, to acquire an authentication result information ciphertext $Pub_{REQ} \oplus Nonce_{REQPub}$; and
(4) calculating a digital signature $Sig_{AS\_REQ}$.

At S612, AS-REQ sends a second authentication response message AS-REQVeri to AS-AAC.

AS-REQVeri includes $ID_{AAC}$, $Nonce_{AAC}$, $Pub_{REQ} \oplus Nonce_{REQPub}$, and $Sig_{AS\_REQ}$. $ID_{AAC}$ and $Nonce_{AAC}$ shall be respectively equal to corresponding fields in AS-AACVeri, and $Nonce_{REQPub}$ shall be equal to a corresponding field in CS-DECRep. To-be-signed data of $Sig_{AS\_REQ}$ includes $ID_{AAC}$, $Nonce_AAc$, and $Pub_{REQ} \oplus Nonce_{REQPub}$.

At S613, AS-AAC upon receiving AS-REQVeri, performs the following operations:
(1) using a public key of AS-REQ to verify $Sig_{AS\_REQ}$, and if verification is not successful, discarding AS-REQVeri; and
(2) calculating a digital signature $Sig_{AS\_AAC}$.

At S614, AS-AAC sends a first authentication response message ASVeri to the AAC.

ASVeri includes $ID_{AAC}$, $Nonce_{AAC}$. $Pub_{REQ} \oplus Nonce_{REQPub}$, and $Sig_{AS\_AAC}$. $ID_{AAC}$, $Nonce_{AAC}$, and $Pub_{REQ} \oplus Nonce_{REQPub}$ shall be respectively equal to corresponding fields in AS-REQVeri. To-be-signed data of $Sig_{AS\_AAC}$ includes $ID_{AAC}$, $Nonce_{AAC}$, and $Pub_{REQ}$ $Nonce_{REQPub}$.

At S615, the AAC upon receiving ASVeri, performs the following operations:
(1) checking whether $ID_{AAC}$ and $Nonce_{AAC}$ are respectively the same as the identifier $ID_{AAC}$ of the AAC and $Nonce_{AAC}$ generated by the AAC;
(2) using a public key of AS-AAC to verify $Sig_{AS\_AAC}$; and
(3) if both the above checking and verification are successful, calculating a first message integrity check code $MacTag_{AAC}$; or if any operation in the above checking or verification is not successful, discarding ASVeri immediately.

At S616, the AAC sends an authentication result recovery request message AACAuth to the REQ.

AACAuth includes $Nonce_{REQ}$, $Nonce_{AAC}$, and $MacTag_{ACC}$, $Nonce_{REQ}$ and $Nonce_{AAC}$ are optional fields, and shall be respectively equal to $Nonce_{REQ}$ in REQInit and $Nonce_{AAC}$ generated by the AAC. A calculation process of $MacTag_{AAC}$ is as described in the embodiment of FIG. 3.

At S617, the REQ upon receiving AACAuth, performs the following operations:
(1) if $Nonce_{REQ}$ and/or $Nonce_{AAC}$ is present in AACAuth, checking whether $Nonce_{REQ}$ is the same as $Nonce_{REQ}$ generated by the REQ, and/or checking whether $Nonce_{AAC}$ is the same as $Nonce_{AAC}$ in received AACInit;
(2) verifying $MacTag_{AAC}$, the verification process being as described in the embodiment of FIG. 3;
(3) after both the above checking and verification are successful, using the message encryption key and the symmetric encryption algorithm to calculate a protection nonce ciphertext $EncData_{REQ}$, or if any operation in the above checking or verification is not successful, discarding AACAuth immediately;
(4) calculating a second message integrity check code $MacTag_{REQ}$.

At S618, the REQ sends an authentication result recovery message REQAuth to the AAC.

REQAuth includes $Nonce_{REQ}$, $Nonce_{AAC}$, $EncData_{REQ}$, and $MacTag_{REQ}$. $Nonce_{REQ}$ and $Nonce_{AAC}$ are optional fields, and shall be respectively equal to $Nonce_{REQ}$ generated by the REQ and $Nonce_{ACC}$ in AACInit. Encryption data of $EncData_{REQ}$ includes $Nonce_{REQPub}$. A calculation process of $MacTag_{REQ}$ is as described in the embodiment of FIG. 3.

At S619, the AAC upon receiving REQAuth, performs the following operations:
(1) if $Nonce_{REQ}$ and/or $Nonce_{AAC}$ is present in REQAuth, checking whether $Nonce_{REQ}$ is the same as $Nonce_{REQ}$ in received REQInit, and/or checking whether $Nonce_{AAC}$ is the same as $Nonce_{AAC}$ generated by the AAC;
(2) verifying $MacTag_{REQ}$, the verification process being as described in the embodiment of FIG. 3;

(3) after the above checking and verification are successful, using the message encryption key and the symmetric encryption algorithm to decrypt $EncData_{REQ}$ to acquire $Nonce_{REQPub}$, or if any operation in the above checking or verification is not successful, discarding REQAuth immediately;

(4) performing an XOR operation on $Nonce_{REQ}p$, and $Pub_{REQ} \oplus Nonce_{REQ}u$, to recover $Pub_{REQ}$; and (5) determining an identity authentication result of the REQ according to $Res_{REQ}$ in $Pub_{REQ}$.

In the above embodiments, each message may also carry a hash value $HASH_{X\_Y}$, and the hash value $HASH_{X\_Y}$ is acquired by a sending entity X of the message by using a hash algorithm to perform calculation on a received latest preceding message sent by a peer entity Y. and is used by the peer entity Y to verify whether the entity X receives the complete latest preceding message. $HASH_{REQ\_AAC}$ represents a hash value calculated by the REQ for a received latest preceding message sent by the AAC. $HASH_{AAC\_REQ}$ represents a hash value calculated by the AAC for a received latest preceding message sent by the REQ. $HASH_{AAC\_AS\_AAC}$ represents a hash value calculated by the AAC for a received latest preceding message sent by AS-AAC. $HASH_{AS\_AAC\_AAC}$ represents a hash value calculated by AS-AAC for a received latest preceding message sent by the AAC. $HASH_{AS\_AAC\_AS\_REQ}$ represents a hash value calculated by AS-AAC for a received latest preceding message sent by AS-REQ. $HASH_{AS\_REQ\_AS\_AAC}$ represents a hash value calculated by AS-REQ for a received latest preceding message sent by AS-AAC. If a message currently sent by the sending entity X is the first message exchanged between the entity X and the entity Y, it is indicated that the entity X has not yet received a preceding message sent by the peer entity Y, so that $HASH_{X\_Y}$ may not be present in this message, or $HASH_{X\_Y}$ in this message is meaningless.

Correspondingly, after the peer entity Y receives a message sent by the entity X, if the message include $HASH_{X\_Y}$: if the entity Y has not sent any preceding message to the entity X before, the entity Y ignores $HASH_{X\_Y}$ or if the entity Y has sent a preceding message to the entity X before, the entity Y uses a hash algorithm to locally calculate a hash value for a latest preceding message sent to the entity X previously, and compares the same with a hash value $HASH_{X\_Y}$ carried in a received message, and if the two hash values are consistent with each other, performs a subsequent operations, or if the two hash values are not consistent with each other, discards the received message or ends the current authentication process.

In the present invention, for the entity X, a preceding message sent by the peer entity Y to the entity X is a message sent by the peer entity Y to the entity X that is received before the entity X sends a message M to the peer entity Y, and a latest preceding message sent by the peer entity Y to the entity X is a latest message sent by the peer entity Y to the entity X that is received before the entity X sends a message M to the peer entity Y. If the message M sent by the entity X to the peer entity Y thereof is the first message exchanged between the entity X and the entity Y, a preceding message sent by the peer entity Y to the entity X is not present before the entity X sends the message M to the peer entity Y thereof.

It should be noted that the optional fields and optional operations in the above embodiments of FIG. 3, FIG. 4, FIG. 5, and FIG. 6 are represented by "*" in FIG. 3, FIG. 4, FIG. 5, and FIG. 6 of the accompanying drawings of the specification. No limitation is set on the order of various contents included in the messages involved in the above embodiments, and if not specified otherwise, no limitation is set on the order of operations performed by a message receiver on relevant messages upon receiving the messages or the order of processing performed on contents included in the messages.

Figure 7:
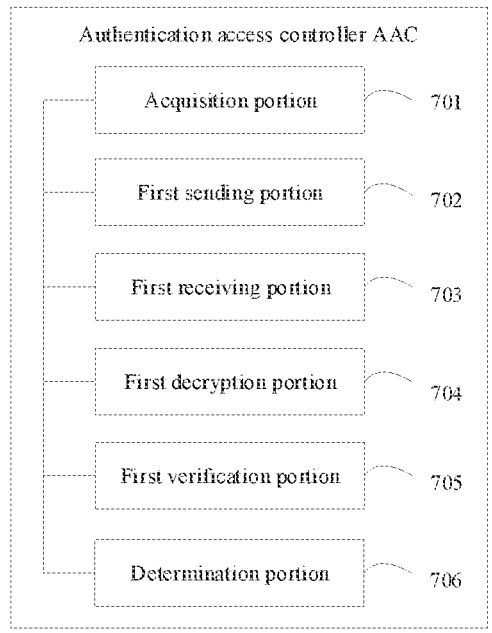
FIG. 7 is a structural block diagram of an authentication access controller (AAC) according to an embodiment of the present application.

On the basis of the method embodiments corresponding to FIGS. 1-6, and with reference to FIG. 7, provided in an embodiment of the present application is an authentication access controller (AAC), including:

an acquisition portion 701, configured to acquire an identity ciphertext message sent by a requester, the identity ciphertext message including an identity information ciphertext of the requester, and the identity information ciphertext being generated by using a public key of an encryption certificate to encrypt information including a digital certificate of the requester and a protection nonce;

a first sending portion 702, configured to send a first authentication request message to a first authentication server trusted by the authentication access controller, the first authentication request message including the identity information ciphertext of the requester;

a first receiving portion 703, configured to receive a first authentication response message sent by the first authentication server, the first authentication response message including an authentication result information ciphertext and a digital signature of the first authentication server, the authentication result information ciphertext being generated by a second authentication server trusted by the requester by using the protection nonce acquired by decrypting the identity information ciphertext to encrypt information including identity authentication result information of the requester, and the identity authentication result information including a verification result of the digital certificate of the requester acquired by decrypting the identity information ciphertext;

a first decryption portion 704, configured to use a message encryption key to decrypt a protection nonce ciphertext acquired from the requester to acquire the protection nonce, and use the protection nonce to decrypt the authentication result information ciphertext to acquire the identity authentication result information of the requester, the protection nonce ciphertext being generated by the requester by using the message encryption key to encrypt information including the protection nonce;

a first verification portion 705, configured to verify the digital signature of the first authentication server; and a determination portion 706, configured to determine, after the digital signature of the first authentication server is successfully verified, an identity authentication result of the requester according to the verification result of the digital certificate of the requester in the identity authentication result information.

Optionally, the authentication access controller further includes:

a second sending portion, configured to send a key request message to the requester, the key request message including a key exchange parameter of the authentication access controller, and the identity ciphertext message acquired by the acquisition portion 701 further including a key exchange parameter of the requester; and a first calculation portion, configured to perform key exchange calculation according to a temporary private key corresponding to the key exchange parameter of the authentication access controller and a temporary public key included in the key exchange parameter of the requester, and generate a first key, and calculate the message encryption key according to information including the first key and by using a key derivation algorithm.

Optionally, the key request message sent by the second sending portion further includes a first nonce generated by the authentication access controller, and the identity ciphertext message acquired by the acquisition portion 701 further includes a second nonce generated by the requester.

The first calculation portion is further configured to calculate the message encryption key according to information including the first key, the first nonce, and the second nonce.

Optionally, the identity ciphertext message acquired by the acquisition portion 701 further includes the first nonce, and the authentication access controller further includes:
- a second verification portion, configured to verify the consistency between the first nonce in the identity ciphertext message and the first nonce generated by the authentication access controller.

Optionally, the key request message sent by the second sending portion further includes security capability parameter information supported by the authentication access controller, so that the identity ciphertext message acquired by the acquisition portion 701 further includes a specific security policy determined by the requester according to the security capability parameter information.

Optionally, the identity ciphertext message further includes the protection nonce ciphertext, so that the first decryption portion 704 is further configured to use the message encryption key to decrypt the protection nonce ciphertext in the identity ciphertext message sent by the requester to acquire the protection nonce.

Optionally, the authentication access controller further includes:
- a second receiving portion, configured to receive an authentication result recovery message sent by the requester, the authentication result recovery message including the protection nonce ciphertext, and
- correspondingly, the first decryption portion 704 being further configured to use the message encryption key to decrypt the protection nonce ciphertext in the authentication result recovery message to acquire the protection nonce.

Optionally, the authentication result recovery message received by the second receiving portion further includes a second message integrity check code, the second message integrity check code is generated by the requester by using a message integrity check key to perform calculation on fields other than the second message integrity check code in the authentication result recovery message, and the authentication access controller further includes:
- a third verification portion, configured to use the message integrity check key to verify the second message integrity check code.

Optionally, the authentication access controller further includes:
- a third sending portion, configured to send an authentication result recovery request message to the requester, the authentication result recovery request message including a first message integrity check code, and the first message integrity check code being generated by the second calculation portion of the authentication access controller by using a message integrity check key to perform calculation on fields other than the first message integrity check code in the authentication result recovery request message.

Optionally, the identity ciphertext message acquired by the acquisition portion 701 further includes a digital signature of the requester, so that before the determination portion determines the identity authentication result of the requester, the determination portion is further configured to: determine whether the digital signature of the requester is successfully verified, and if it is determined that the digital signature of the requester is successfully verified, determine the identity authentication result of the requester.

Optionally, the determination portion 706 is further configured to:
- if the identity authentication result information acquired by the first decryption portion 704 by decrypting the authentication result information ciphertext further includes the digital certificate of the requester, determine, according to a verification result, whether the digital signature of the requester is successfully verified when the determination portion 706 uses the digital certificate of the requester to verify the digital signature of the requester; or
- the second authentication server uses the digital certificate of the requester acquired by decrypting the identity information ciphertext to verify the digital signature of the requester, and if the authentication access controller receives the first authentication response message, then the determination portion 706 determines that the digital signature of the requester is successfully verified.

Optionally, the authentication result recovery message received by the second receiving portion further includes a digital signature of the requester, and the identity authentication result information acquired by the first decryption portion 704 by decrypting the authentication result information ciphertext further includes the digital certificate of the requester, so that before the determination portion 706 determines the identity authentication result of the requester, the determination portion 706 is further configured to: use the digital certificate of the requester in the identity authentication result information acquired by means of decryption to verify the digital signature of the requester, and if it is determined that the digital signature of the requester is successfully verified, determine the identity authentication result of the requester.

Optionally, the key request message sent by the second sending portion further includes the identifier of at least one authentication server trusted by the authentication access controller, and correspondingly, the identity ciphertext message acquired by the acquisition portion 701 further includes the identifier of at least one authentication server trusted by the requester,
- so that the determination portion 706 is further configured to determine the first authentication server according to the identifier of the at least one authentication server trusted by the requester and the identifier of the at least one authentication server trusted by the authentication access controller in the key request message.

Optionally, the identity ciphertext message acquired by the acquisition portion 701 further includes the identifier of at least one authentication server trusted by the requester,
- so that the determination portion 706 is further configured to determine the first authentication server according to the identifier of the at least one authentication server trusted by the requester and an identifier of an authentication server trusted by the authentication access controller.

Optionally, the identity ciphertext message further includes a second nonce generated by the requester and a first nonce acquired by the requester from the authentication access controller, the first authentication request message sent by the first sending portion 702 further including an identifier of the authentication access controller and/or the first nonce, the first authentication response message received by the first receiving portion 703 further including the identifier of the authentication access controller and/or the first nonce, and the authentication result recovery message received by the second receiving portion further including the first nonce and/or the second nonce.

Correspondingly, the authentication access controller further includes:

a fourth verification portion, configured to verify, before the determination portion 706 determines the identity authentication result of the requester, the consistency between the identifier of the authentication access controller and/or the first nonce in the first authentication response message and an identifier of the authentication access controller and/or a first nonce generated by the authentication access controller, the fourth verification portion being further configured to verify, before the determination portion 706 determines the identity authentication result of the requester, the consistency between the first nonce and/or the second nonce in the authentication result recovery message and the first nonce generated by the authentication access controller and/or the second nonce in the identity ciphertext message.

Optionally, a message sent by the authentication access controller to the requester further includes a hash value calculated by the authentication access controller for a received latest preceding message sent by the requester, and a message sent by the authentication access controller to the first authentication server further includes a hash value calculated by the authentication access controller for a received latest preceding message sent by the first authentication server.

Figure 8:
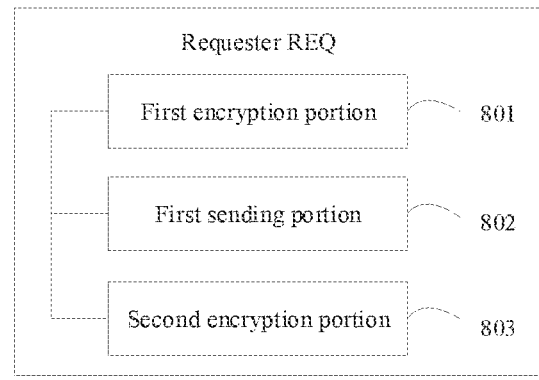
FIG. 8 is a structural block diagram of a requester (REQ) according to an embodiment of the present application.

Referring to FIG. 8, further provided in an embodiment of the present application is a requester REQ, including:

a first encryption portion 801, configured to use a public key of an encryption certificate to encrypt information including a digital certificate of the requester and a protection nonce and generate an identity information ciphertext;

a first sending portion 802, configured to send an identity ciphertext message to an authentication access controller, the identity ciphertext message including the identity information ciphertext of the requester; and a second encryption portion 803, configured to use a message encryption key to encrypt information including the protection nonce and generate a protection nonce ciphertext.

Optionally, the requester further includes:

a first receiving portion, configured to receive a key request message sent by the authentication access controller, the key request message including a key exchange parameter of the authentication access controller; and a first calculation portion, configured to perform key exchange calculation according to a temporary private key corresponding to a key exchange parameter of the requester and a temporary public key included in the key exchange parameter of the authentication access controller, and generate a first key, and calculate the message encryption key according to information including the first key and by using a key derivation algorithm, the identity ciphertext message sent by the first sending portion 802 further including the key exchange parameter of the requester.

Optionally, the key request message received by the first receiving portion further includes a first nonce generated by the authentication access controller, and the first calculation portion is further configured to calculate the message encryption key according to information including the first key, the first nonce, and a second nonce generated by the requester, the identity ciphertext message sent by the first sending portion 802 further including the second nonce.

Optionally, the identity ciphertext message sent by the first sending portion 802 further includes the first nonce.

Optionally, the key request message received by the first receiving portion further includes security capability parameter information supported by the authentication access controller, and the requester further includes:

a first determination portion, configured to determine, according to the security capability parameter information, a specific security policy used by the requester, the identity ciphertext message sent by the first sending portion 802 further including the specific security policy.

Optionally, the identity ciphertext message sent by the first sending portion 802 further includes the protection nonce ciphertext.

Optionally, the requester further includes:

a second sending portion, configured to send an authentication result recovery message to the authentication access controller, the authentication result recovery message including the protection nonce ciphertext.

Optionally, the authentication result recovery message sent by the second sending portion further includes a second message integrity check code, and the requester further includes:

a second calculation portion, the second message integrity check code being generated by the second calculation portion by using a message integrity check key to perform calculation on fields other than the second message integrity check code in the authentication result recovery message.

Optionally, the requester further includes:

a second receiving portion, configured to receive an authentication result recovery request message sent by the authentication access controller and including a first message integrity check code, the first message integrity check code being generated by the authentication access controller by using a message integrity check key to perform calculation on fields other than the first message integrity check code in the authentication result recovery request message; and a verification portion, configured to use the message integrity check key to verify the first message integrity check code.

Optionally, the key request message received by the first receiving portion further includes the identifier of at least one authentication server trusted by the authentication access controller, and the requester further includes:

a second determination portion, configured to determine, according to the identifier of the at least one authentication server trusted by the authentication access controller, the identifier of at least one authentication server trusted by the requester, the identity ciphertext message sent by the first sending portion 802 further including the identifier of the at least one authentication server trusted by the requester.

Optionally, the identity ciphertext message sent by the first sending portion 802 further includes the identifier of at least one authentication server trusted by the requester.

Optionally, a message sent by the requester to the authentication access controller further includes a hash value calculated by the requester for a received latest preceding message sent by the authentication access controller.

Figure 9:
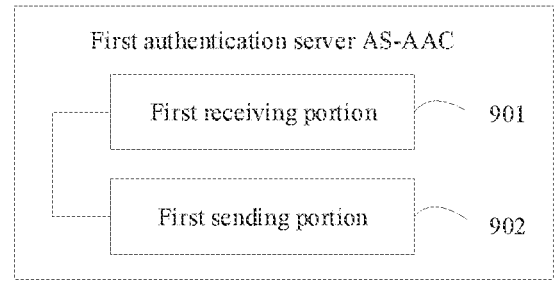
FIG. 9 is a structural block diagram of a first authentication server AS-AAC according to an embodiment of the present application.

Referring to FIG. 9, further provided in an embodiment of the present application is a first authentication server AS-AAC, which is an authentication server trusted by an authentication access controller, and includes:
- a first receiving portion 901, configured to receive a first authentication request message sent by an authentication access controller, the first authentication request message including an identity information ciphertext of the requester, and the identity information ciphertext being generated by using a public key of an encryption certificate to encrypt information including a digital certificate of the requester and a protection nonce; and
- a first sending portion 902, configured to send a first authentication response message to the authentication access controller, the first authentication response message including an authentication result information ciphertext and a digital signature of the first authentication server, the authentication result information ciphertext being generated by a second authentication server trusted by the requester by using the protection nonce acquired by decrypting the identity information ciphertext to encrypt information including identity authentication result information of the requester, and the identity authentication result information including a verification result of the digital certificate of the requester acquired by decrypting the identity information ciphertext;

Optionally, when the first authentication server trusted by the authentication access controller and the second authentication server trusted by the requester are the same authentication server, the first authentication server further includes:
- a decryption portion, configured to use a private key corresponding to the encryption certificate to decrypt the identity information ciphertext to acquire the digital certificate of the requester and the protection nonce;
- a first verification portion, configured to perform legality verification on the digital certificate of the requester to acquire the verification result of the digital certificate; and
- a first generation portion, configured to generate the identity authentication result information according to information including the verification result of the digital certificate, use the protection nonce to encrypt the information including the identity authentication result information and generate the authentication result information ciphertext, perform calculation on to-be-signed data including the authentication result information ciphertext and generate the digital signature of the first authentication server, and generate the first authentication response message according to information including the authentication result information ciphertext and the digital signature of the first authentication server.

Optionally, when the first authentication server trusted by the authentication access controller and the second authentication server trusted by the requester are two different authentication servers, the first authentication server further includes:
- a second sending portion, configured to send a second authentication request message to the second authentication server, the second authentication request message including the identity information ciphertext of the requester;
- a second receiving portion, configured to receive a second authentication response message sent by the second authentication server, the second authentication response message including the authentication result information ciphertext and a digital signature of the second authentication server;
- a second verification portion, configured to use a public key of the second authentication server to verify the digital signature of the second authentication server; and
- a second generation portion, configured to perform calculation, when the digital signature of the second authentication server is successfully verified, on the to-be-signed data including the authentication result information ciphertext and generate the digital signature of the first authentication server, and generate the first authentication response message according to information including the authentication result information ciphertext and the digital signature of the first authentication server.

Optionally, a message sent by the first authentication server to the authentication access controller further includes a hash value calculated by the first authentication server for a received latest preceding message sent by the authentication access controller, and a message sent by the first authentication server to the second authentication server further includes a hash value calculated by the first authentication server for a received latest preceding message sent by the second authentication server.

Figure 10:
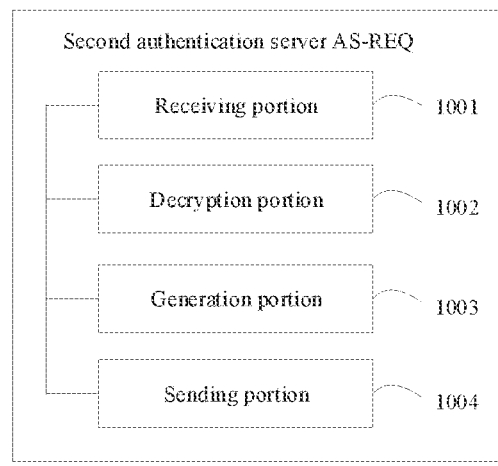
FIG. 10 is a structural block diagram of a second authentication server AS-REQ according to an embodiment of the present application.

Referring to FIG. 10, further provided in an embodiment of the present application is a second authentication server AS-REQ, which is an authentication server trusted by a requester. When a first authentication server trusted by an authentication access controller and the second authentication server trusted by the requester are two different authentication servers, the second authentication server includes:
- a receiving portion 1001, configured to receive a second authentication request message sent by the first authentication server, the second authentication request message including an identity information ciphertext of the requester, and the identity information ciphertext being generated by using a public key of an encryption certificate to encrypt information including a digital certificate of the requester and a protection nonce; and
- a decryption portion 1002, configured to use a private key corresponding to the encryption certificate to decrypt encrypted identity information of the requester to acquire the digital certificate of the requester and the protection nonce;
- a generation portion 1003, configured to perform legality verification on the digital certificate to acquire a verification result of the digital certificate, generate identity authentication result information according to information including the verification result of the digital certificate, use the protection nonce to encrypt the information including the identity authentication result information and generate an authentication result information ciphertext, perform calculation on to-be-signed data including the authentication result information ciphertext and generate a digital signature of the second authentication server, and generate a second authentication response message according to information including the authentication result information ciphertext and the digital signature of the second authentication server; and a sending portion 1004, configured to send the second authentication response message to the first authentication server.

Optionally, a message sent by the second authentication server to the first authentication server further includes a hash value calculated by the second authentication server for a received latest preceding message sent by the first authentication server.

It should be noted that in the embodiments of the present application and other embodiments, the "portion" may be some circuits, some processors, some programs or software, or the like, or certainly, may be units, and may be modular or non-modular.

Figure 11:
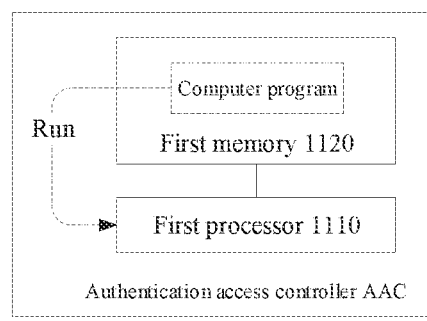
FIG. 11 is a block diagram of a hardware structure of an authentication access controller (AAC) according to an embodiment of the present application.

Referring to FIG. 11, further provided in an embodiment of the present application is an authentication access controller AAC, including: a first processor 1110 and a first memory 1120. The first processor 1110 can call, from the first memory 1120, and run a computer program so as to implement the operations performed by the AAC in the above embodiments.

The first memory 1120 may be a separate device independent of the first processor 1110, or may be integrated in the first processor 1110.

It should be understood that the authentication access controller can implement the respective processes implemented by the AAC in the various methods of the embodiments of the present application. For brevity, details will not be described herein again.

Figure 12:
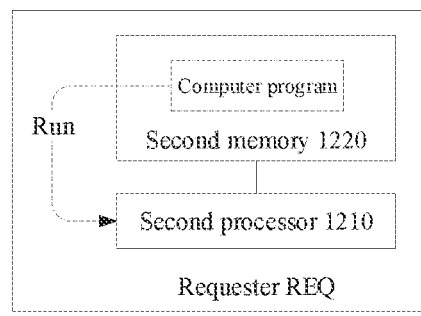
FIG. 12 is a block diagram of a hardware structure of a requester (REQ) according to an embodiment of the present application.

Referring to FIG. 12, further provided in an embodiment of the present application is a requester REQ, including: a second processor 1210 and a second memory 1220. The second processor 1210 can call, from the second memory 1220, and run a computer program so as to implement the operations performed by the REQ in the above embodiments.

The second memory 1220 may be a separate device independent of the second processor 1210, or may be integrated in the second processor 1210.

It should be understood that the requester can implement the respective processes implemented by the REQ in the various methods of the embodiments of the present application. For brevity, details will not be described herein again.

Figure 13:
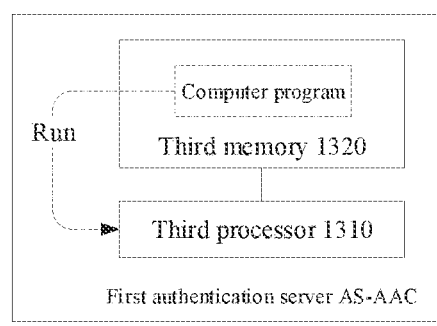
FIG. 13 is a block diagram of a hardware structure of a first authentication server AS-AAC according to an embodiment of the present application.

Referring to FIG. 13, further provided in an embodiment of the present application is a first authentication server AS-AAC, including: a third processor 1310 and a third memory 1320. The third processor 1310 can call, from the third memory 1320, and run a computer program so as to implement the operations performed by AS-AAC in the above embodiments.

The third memory 1320 may be a separate device independent of the third processor 1310, or may be integrated in the third processor 1310.

It should be understood that the first authentication server can implement the respective processes implemented by AS-AAC in the various methods of the embodiments of the present application. For brevity, details will not be described herein again.

Figure 14:
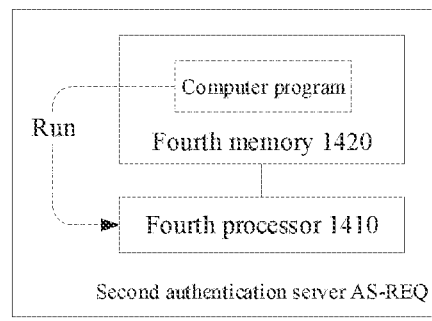
FIG. 14 is a block diagram of a hardware structure of a second authentication server AS-REQ according to an embodiment of the present application.

Referring to FIG. 14, further provided in an embodiment of the present application is a second authentication server AS-REQ, including: a fourth processor 1410 and a fourth memory 1420. The fourth processor 1410 can call, from the fourth memory 1420, and run a computer program so as to implement the operations performed by AS-REQ in the above embodiments.

The fourth memory 1420 may be a separate device independent of the fourth processor 1410, or may be integrated in the fourth processor 1410.

It should be understood that the second authentication server can implement the respective processes implemented by AS-REQ in the various methods of the embodiments of the present application. For brevity, details will not be described herein again.

Further provided in an embodiment of the present application is a computer-readable storage medium, having a computer program stored thereon, the computer program, when run by a processor, performing operations performed by the authentication access controller AAC, the requester REQ, the first authentication server AS-AAC, or the second authentication server AS-REQ in the above identity authentication method. The storage medium may be a volatile or non-volatile computer-readable storage medium.

It should be noted that the storage medium may be at least one of the following media: a read-only memory (ROM), a RAM, a magnetic disk, an optical disc, or any medium capable of storing program code.

Further provided in an embodiment of the present application is a computer program, including computer-readable code. When the computer-readable code is run in an electronic apparatus, a processor in the electronic apparatus performs operations performed by the authentication access controller AAC, the requester REQ, the first authentication server AS-AAC, or the second authentication server AS-REQ in the above identity authentication method.

Further provided in an embodiment of the present application is a computer program product, including computer program instructions used to perform operations performed by the authentication access controller AAC, the requester REQ, the first authentication server AS-AAC, or the second authentication server AS-REQ in the above identity authentication method. Reference can be made to the above method embodiments, and details will not be described herein again.

It should be noted that the embodiments in the present specification are described in a progressive manner, and for identical or similar parts between different embodiments, reference may be made to each other so that each of the embodiments focuses on differences from other embodiments. Especially, the apparatus and system embodiments are described relatively briefly because of being consistent with and corresponding to the method embodiments, and for related parts, reference may be made to the method embodiments. The apparatus and system embodiments described above are merely illustrative. The portions described as separate components may or may not be physically separated, and the components shown as portions may or may not be physical units, which may be located in one place or may be distributed onto a plurality of network units. The objective of the solution of this embodiment may be achieved by selecting some or all of the modules according to actual requirements. Those of ordinary skill in the art can understand and perform implementation without creative efforts.

The above description is merely a specific embodiment of the present application, and the scope of protection of the present application is not limited thereto. Any changes or replacements that could be readily conceived of by any person skilled in the art within the technical scope disclosed by the present application shall fall within the scope of protection of the present application. Therefore, the scope of protection of the present application is subject to the scope of protection of the claims.

INDUSTRIAL APPLICABILITY

According to the identity authentication method provided in the present application, confidentiality processing can be performed on identity information of a requester during identity information transmission, and the identity information can be prevented from being exposed while the requester is accessing a network, thereby ensuring that an attacker cannot acquire private or sensitive information. In addition, an authentication server is introduced, so that an authentication access controller can perform a unilateral real-time identity authentication on a requester while confidentiality of identity related information of entities is ensured, thereby laying the foundation for ensuring that only a legitimate user can access the network.

The invention claimed is:

1. An identity authentication method, comprising:
   acquiring, by an authentication access controller, an identity ciphertext message sent by a requester, the identity ciphertext message comprising an identity information ciphertext of the requester, and the identity information ciphertext being generated by using a public key of an encryption certificate to encrypt information comprising a digital certificate of the requester and a protection nonce;
   sending, by the authentication access controller, a first authentication request message to a first authentication server trusted thereby, the first authentication request message comprising the identity information ciphertext of the requester;
   receiving, by the authentication access controller, a first authentication response message sent by the first authentication server, the first authentication response message comprising an authentication result information ciphertext and a digital signature of the first authentication server, the authentication result information ciphertext being generated by a second authentication server trusted by the requester through using the protection nonce acquired by decrypting the identity information ciphertext to encrypt information comprising identity authentication result information of the requester, and the identity authentication result information comprising a verification result of the digital certificate of the requester acquired by decrypting the identity information ciphertext;
   using, by the authentication access controller, a message encryption key to decrypt a protection nonce ciphertext acquired from the requester to acquire the protection nonce, and using the protection nonce to decrypt the authentication result information ciphertext to acquire the identity authentication result information of the requester, the protection nonce ciphertext being generated by the requester through using the message encryption key to encrypt information comprising the protection nonce;
   verifying, by the authentication access controller, the digital signature of the first authentication server; and
   after the digital signature of the first authentication server is successfully verified, determining, by the authentication access controller, an identity authentication result of the requester according to the verification result of the digital certificate of the requester in the identity authentication result information.

2. The method according to claim 1, wherein before the authentication access controller acquires the identity ciphertext message sent by the requester, the method further comprises:
   sending, by the authentication access controller, a key request message to the requester, the key request message comprising a key exchange parameter of the authentication access controller;
   performing, by the requester, key exchange calculation according to a temporary private key corresponding to a key exchange parameter of the requester and a temporary public key comprised in the key exchange parameter of the authentication access controller, to generate a first key, and calculating the message encryption key according to information comprising the first key and by using a key derivation algorithm, and
   correspondingly, the identity ciphertext message further comprising the key exchange parameter of the requester; and
   performing, by the authentication access controller, key exchange calculation according to a temporary private key corresponding to the key exchange parameter of the authentication access controller and a temporary public key comprised in the key exchange parameter of the requester, to generate the first key, and calculating the message encryption key according to information comprising the first key and by using the key derivation algorithm.

3. The method according to claim 2, wherein the key request message further comprises a first nonce generated by the authentication access controller,
   calculating, by the requester, the message encryption key further comprises:
   calculating, by the requester, the message encryption key according to information comprising the first key, the first nonce, and a second nonce generated by the requester; and
   correspondingly, the identity ciphertext message further comprises the second nonce,
   calculating, by the authentication access controller, the message encryption key further comprises:
   calculating, by the authentication access controller, the message encryption key according to information comprising the first key, the first nonce, and the second nonce.

4. The method according to claim 3, wherein the identity ciphertext message further comprises the first nonce,
   before the authentication access controller calculates the message encryption key, the method further comprises:
   verifying, by the authentication access controller, the consistency between the first nonce in the identity ciphertext message and the first nonce generated by the authentication access controller; and
   when verification is successful, calculating, by the authentication access controller, the message encryption key.

5. The method according to claim 2, wherein the key request message further comprises security capability parameter information supported by the authentication access controller, and the method further comprises:
   determining, by the requester, a specific security policy used by the requester according to the security capability parameter information, wherein the identity ciphertext message further comprises the specific security policy.

6. The method according to claim 1, wherein the identity ciphertext message further comprises the protection nonce ciphertext, and using, by the authentication access controller, the message encryption key to decrypt the protection nonce ciphertext to acquire the protection nonce comprises:

using, by the authentication access controller, the message encryption key to decrypt the protection nonce ciphertext in the identity ciphertext message sent by the requester to acquire the protection nonce.

7. The method according to claim 1, wherein after the requester has sent the identity ciphertext message, the method further comprises:

sending, by the requester, an authentication result recovery message to the authentication access controller, the authentication result recovery message comprising the protection nonce ciphertext, using, by the authentication access controller, the message encryption key to decrypt the protection nonce ciphertext to acquire the protection nonce comprises:

using, by the authentication access controller, the message encryption key to decrypt the protection nonce ciphertext in the authentication result recovery message sent by the requester to acquire the protection nonce.

8. The method according to claim 7, wherein the authentication result recovery message further comprises a second message integrity check code, and the second message integrity check code is generated by the requester through using a message integrity check key to perform calculation on fields other than the second message integrity check code in the authentication result recovery message, the manner in which the message integrity check key used by the requester is generated being same as the manner in which the requester generates the message encryption key; and correspondingly, before the authentication access controller decrypts the protection nonce ciphertext, the method further comprises:

using, by the authentication access controller, the message integrity check key to verify the second message integrity check code; and when verification is successful, performing, by the authentication access controller, a relevant operation, the manner in which the message integrity check key used by the authentication access controller is generated being same as the manner in which the authentication access controller generates the message encryption key.

9. The method according to claim 7, wherein before the requester sends the authentication result recovery message, the method further comprises:

sending, by the authentication access controller, an authentication result recovery request message to the requester, the authentication result recovery request message comprising a first message integrity check code, the first message integrity check code being generated by the authentication access controller through using a message integrity check key to perform calculation on fields other than the first message integrity check code in the authentication result recovery request message, and the manner in which the message integrity check key used by the authentication access controller is generated being same as the manner in which the authentication access controller generates the message encryption key; and correspondingly, using, by the requester, the message integrity check key to verify the first message integrity check code; and when verification is successful, performing, by the requester, a relevant operation, the manner in which the message integrity check key used by the requester is generated being same as the manner in which the requester generates the message encryption key.

10. The method according to claim 1, wherein the identity ciphertext message further comprises a digital signature of the requester, and before the authentication access controller determines the identity authentication result of the requester, the method further comprises:

determining, by the authentication access controller, whether the digital signature of the requester is successfully verified, and when it is determined that the digital signature of the requester is successfully verified, determining the identity authentication result of the requester according to the verification result of the digital certificate of the requester.

11. The method according to claim 10, wherein determining, by the authentication access controller, whether the digital signature of the requester is successfully verified comprises:

when the identity authentication result information acquired by the authentication access controller through decrypting the authentication result information ciphertext further comprises the digital certificate of the requester, using, by the authentication access controller, the digital certificate of the requester to verify the digital signature of the requester, and determining, according to a verification result, whether the digital signature of the requester is successfully verified; or using, by the second authentication server, the digital certificate of the requester acquired by decrypting the identity information ciphertext to verify the digital signature of the requester, and when the authentication access controller receives the first authentication response message, determining that the digital signature of the requester is successfully verified.

12. The method according to claim 7, wherein the authentication result recovery message further comprises a digital signature of the requester, and the identity authentication result information acquired by the authentication access controller through decrypting the authentication result information ciphertext further comprises the digital certificate of the requester; and before the authentication access controller determines the identity authentication result of the requester, the method further comprises:

using, by the authentication access controller, the digital certificate of the requester in the identity authentication result information acquired by means of decryption to verify the digital signature of the requester, and when it is determined that the digital signature of the requester is successfully verified, determining the identity authentication result of the requester according to the verification result of the digital certificate of the requester.

13. The method according to claim 2, wherein the key request message further comprises the identifier of at least one authentication server trusted by the authentication access controller, and the method further comprises:

determining, by the requester, the identifier of at least one authentication server trusted by the requester according to the identifier of the at least one authentication server trusted by the authentication access controller, wherein the identity ciphertext message further comprises the identifier of the at least one authentication server trusted by the requester, and the method further comprises:
  determining, by the authentication access controller, the first authentication server according to the identifier of the at least one authentication server trusted by the requester and the identifier of the at least one authentication server trusted by the authentication access controller in the key request message.

14. The method according to claim 1, wherein the identity ciphertext message further comprises the identifier of at least one authentication server trusted by the requester, and the method further comprises:
  determining, by the authentication access controller, the first authentication server according to the identifier of the at least one authentication server trusted by the requester and an identifier of an authentication server trusted by the authentication access controller.

15. The method according to claim 7, wherein the identity ciphertext message further comprises a second nonce generated by the requester and a first nonce acquired by the requester from the authentication access controller,
  the first authentication request message further comprises at least one of an identifier of the authentication access controller or the first nonce,
  the first authentication response message further comprises at least one of the identifier of the authentication access controller or the first nonce, and
  the authentication result recovery message further comprises at least one of the first nonce or the second nonce; and
  correspondingly, before the authentication access controller determines the identity authentication result of the requester, the method further comprises:
  verifying, by the authentication access controller, a consistency between at least one of the identifier of the authentication access controller or the first nonce in the first authentication response message and at least one of an identifier of the authentication access controller or a first nonce generated by the authentication access controller; and
  verifying, by the authentication access controller, a consistency between at least one of a first nonce or a second nonce in the authentication result recovery message and at least one of the first nonce generated by the authentication access controller or the second nonce in the identity ciphertext message.

16. The method according to claim 1, wherein when the first authentication server is same as the second authentication server, and before the first authentication server sends the first authentication response message, the method further comprises:
  acquiring, by the first authentication server, the digital certificate of the requester and the protection nonce acquired by using a private key corresponding to the encryption certificate to decrypt the identity information ciphertext, performing legality verification on the digital certificate of the requester to acquire the verification result of the digital certificate, generating the identity authentication result information according to information comprising the verification result of the digital certificate, using the protection nonce to encrypt information comprising the identity authentication result information to generate the authentication result information ciphertext, performing calculation on to-be-signed data comprising the authentication result information ciphertext to generate the digital signature of the first authentication server, and generating the first authentication response message according to information comprising the authentication result information ciphertext and the digital signature of the first authentication server.

17. The method according to claim 1, wherein when the first authentication server is different from the second authentication server, and before the first authentication server sends the first authentication response message, the method further comprises:
  sending, by the first authentication server, a second authentication request message to the second authentication server, the second authentication request message comprising the identity information ciphertext of the requester; acquiring, by the second authentication server, the digital certificate of the requester and the protection nonce acquired by using a private key corresponding to the encryption certificate to decrypt the identity information ciphertext of the requester, performing legality verification on the digital certificate to acquire the verification result of the digital certificate, generating the identity authentication result information according to information comprising the verification result of the digital certificate, using the protection nonce to encrypt information comprising the identity authentication result information to generate the authentication result information ciphertext, performing calculation on to-be-signed data comprising the authentication result information ciphertext to generate a digital signature of the second authentication server, and generating a second authentication response message according to information comprising the authentication result information ciphertext and the digital signature of the second authentication server;
  receiving, by the first authentication server, the second authentication response message sent by the second authentication server, the second authentication response message comprising the authentication result information ciphertext and the digital signature of the second authentication server;
  using, by the first authentication server, a public key of the second authentication server to verify the digital signature of the second authentication server; and
  when verification is successful, performing, by the first authentication server, calculation on the to-be-signed data comprising the authentication result information ciphertext to generate the digital signature of the first authentication server, and generating the first authentication response message according to information comprising the authentication result information ciphertext and the digital signature of the first authentication server.

18. The method according to claim 1, wherein a message sent by the requester to the authentication access controller further comprises a hash value calculated by the requester for a received latest preceding message sent by the authentication access controller,
  upon receiving the message sent by the requester, the authentication access controller verifies the hash value in the received message first, and then performs a subsequent operation after verification is successful;
  wherein a message sent by the authentication access controller to the requester further comprises a hash value calculated by the authentication access controller for a received latest preceding message sent by the requester, upon receiving the message sent by the authentication access controller, the requester verifies the hash value in the received message first, and then performs a subsequent operation after verification is successful;

wherein a message sent by the authentication access controller to the first authentication server further comprises a hash value calculated by the authentication access controller for a received latest preceding message sent by the first authentication server, upon receiving the message sent by the authentication access controller, the first authentication server verifies the hash value in the received message first, and then performs a subsequent operation after verification is successful;

wherein a message sent by the first authentication server to the authentication access controller further comprises a hash value calculated by the first authentication server for a received latest preceding message sent by the authentication access controller, upon receiving the message sent by the first authentication server, the authentication access controller verifies the hash value in the received message first, and then performs a subsequent operation after verification is successful;

wherein a message sent by the first authentication server to the second authentication server further comprises a hash value calculated by the first authentication server for a received latest preceding message sent by the second authentication server, upon receiving the message sent by the first authentication server, the second authentication server verifies the hash value in the received message first, and then performs a subsequent operation after verification is successful;

wherein a message sent by the second authentication server to the first authentication server further comprises a hash value calculated by the second authentication server for a received latest preceding message sent by the first authentication server, upon receiving the message sent by the second authentication server, the first authentication server verifies the hash value in the received message first, and then performs a subsequent operation after verification is successful.

19. An authentication access controller, comprising:
a processor; and
a memory for storing instructions executable by the processor,
wherein the processor is configured to call instructions stored in the memory to:
acquire an identity ciphertext message sent by a requester, the identity ciphertext message comprising an identity information ciphertext of the requester, and the identity information ciphertext being generated by using a public key of an encryption certificate to encrypt information comprising a digital certificate of the requester and a protection nonce;
send a first authentication request message to a first authentication server trusted by the authentication access controller, the first authentication request message comprising the identity information ciphertext of the requester;
receive a first authentication response message sent by the first authentication server, the first authentication response message comprising an authentication result information ciphertext and a digital signature of the first authentication server, the authentication result information ciphertext being generated by a second authentication server trusted by the requester through using the protection nonce acquired by decrypting the identity information ciphertext to encrypt information comprising identity authentication result information of the requester, and the identity authentication result information comprising a verification result of the digital certificate of the requester acquired by decrypting the identity information ciphertext;
use a message encryption key to decrypt a protection nonce ciphertext acquired from the requester to acquire the protection nonce, and use the protection nonce to decrypt the authentication result information ciphertext to acquire the identity authentication result information of the requester, the protection nonce ciphertext being generated by the requester through using the message encryption key to encrypt information comprising the protection nonce;
verify the digital signature of the first authentication server; and
determine, after the digital signature of the first authentication server is successfully verified, an identity authentication result of the requester according to the verification result of the digital certificate of the requester in the identity authentication result information.

20. A requester, comprising:
a processor; and
a memory for storing instructions executable by the processor, wherein the processor is configured to call instructions stored in the memory to:
use a public key of an encryption certificate to encrypt information comprising a digital certificate of the requester and a protection nonce, and generate an identity information ciphertext;
send an identity ciphertext message to an authentication access controller, so that the authentication access controller sends a first authentication request message to a first authentication server trusted by the authentication access controller and the first authentication server sends a second authentication request message to a second authentication server trusted by the requester, wherein the identity ciphertext message comprises the identity information ciphertext of the requester, and both the first authentication request message and the second authentication request message comprise the identity information ciphertext of the requester, wherein the second authentication server acquires the protection nonce by decrypting the identity information ciphertext and uses the protection nonce to encrypt a verification result of the digital certificate of the requester to generate an authentication result information ciphertext;
use a message encryption key and a symmetric encryption algorithm to encrypt information comprising the protection nonce, and generate a protection nonce ciphertext; and
send an authentication result recovery message to the authentication access controller, the authentication result recovery message comprising the protection nonce ciphertext, wherein the authentication access controller decrypts the protection nonce ciphertext to obtain the protection nonce and decrypts the authentication result information ciphertext received from the first authentication server to acquire the verification result of the digital certificate of the requestor.

* * * * *